US010710186B2

(12) United States Patent
Yamada et al.

(10) Patent No.: US 10,710,186 B2
(45) Date of Patent: Jul. 14, 2020

(54) METHOD OF MANUFACTURING IMPELLER

(71) Applicant: EBARA CORPORATION, Tokyo (JP)

(72) Inventors: Esao Yamada, Tokyo (JP); Kentaro Orita, Tokyo (JP); Takashi Yamakawa, Tokyo (JP)

(73) Assignee: EBARA CORPORATION, Tokyo (JP)

(*) Notice: Subject to any disclaimer, the term of this patent is extended or adjusted under 35 U.S.C. 154(b) by 107 days.

(21) Appl. No.: 15/770,944

(22) PCT Filed: Oct. 24, 2016

(86) PCT No.: PCT/JP2016/081401
§ 371 (c)(1),
(2) Date: Apr. 25, 2018

(87) PCT Pub. No.: WO2017/073500
PCT Pub. Date: May 4, 2017

(65) Prior Publication Data
US 2018/0333797 A1 Nov. 22, 2018

(30) Foreign Application Priority Data
Sep. 29, 2016 (JP) .................. 2016-190866

(51) Int. Cl.
B23K 101/00 (2006.01)
B23K 9/02 (2006.01)
(Continued)

(52) U.S. Cl.
CPC .............. B23K 9/02 (2013.01); B23K 9/0026 (2013.01); B23K 9/038 (2013.01); B23K 9/16 (2013.01);
(Continued)

(58) Field of Classification Search
CPC .......... B23K 9/02; B23K 9/16; B23K 9/0026; B23K 9/038; B23K 2101/001; F01D 5/04;
(Continued)

(56) References Cited

U.S. PATENT DOCUMENTS 4,754,118 A * 6/1988 Fukaya ................ B23K 31/022
219/136
5,785,359 A * 7/1998 Nagai .................... B23Q 3/102
285/191

FOREIGN PATENT DOCUMENTS

CN 86101601 A 2/1987
CN 201900705 U 7/2011
(Continued)

OTHER PUBLICATIONS

JPH 05372 Machine translation (Year: 1993).*
(Continued)

Primary Examiner — Lee A Holly
(74) Attorney, Agent, or Firm — Pearne & Gordon LLP

(57) ABSTRACT

A method of manufacturing an impeller, the method including: a step of forming a cover that is provided with a plurality of blades; a step of disposing a core on the cover such that the core is interposed between the blades; a step of disposing a hub on the blades, the hub being a plate on which grooves conforming to shapes of the blades are formed; and a step of welding the hub and the blades, wherein through-holes conforming to the shapes of the blades are provided on the core, such that the blades are fitted in the core when the core is disposed.

16 Claims, 19 Drawing Sheets

(51) Int. Cl.
    *F04D 29/22*     (2006.01)
    *F04D 29/28*     (2006.01)
    *F04D 29/62*     (2006.01)
    *B23K 9/00*     (2006.01)
    *F01D 5/04*     (2006.01)
    *F04D 29/02*     (2006.01)
    *B23K 9/038*     (2006.01)
    *B23K 9/16*     (2006.01)

(52) U.S. Cl.
    CPC ............. *F01D 5/04* (2013.01); *F04D 29/023* (2013.01); *F04D 29/026* (2013.01); *F04D 29/22* (2013.01); *F04D 29/28* (2013.01); *F04D 29/62* (2013.01); *B23K 2101/001* (2018.08); *F05D 2230/10* (2013.01); *F05D 2230/232* (2013.01); *F05D 2230/40* (2013.01); *F05D 2240/24* (2013.01)

(58) Field of Classification Search
    CPC .......... F04D 29/22; F04D 29/28; F04D 29/62; F04D 29/023; F04D 29/026; F04D 2230/10; F04D 2230/232; F05D 2240/24; F05D 2230/40
See application file for complete search history.

(56) References Cited

FOREIGN PATENT DOCUMENTS

| | | | |
|---|---|---|---|
| CN | 104259793 A | | 1/2015 |
| EP | 2 047 938 A1 | | 4/2009 |
| JP | S55-23705 B2 | | 6/1980 |
| JP | S61-262465 A | | 11/1986 |
| JP | H01-205889 A | | 8/1989 |
| JP | 05000372 A | * | 1/1993 |

OTHER PUBLICATIONS

Extended European Search Report issued in European Patent Application No. 16 85 8730 dated May 23, 2019.
Chinese Office Action issued in Patent Application 201680051415 dated Apr. 28, 2019.
International Search Report issued in Patent Application No. PCT/JP2016/081401 dated Nov. 29, 2016.
Written Opinion issued in Patent Application No. PCT/JP2016/081401 dated Nov. 29, 2016.
Chinese Office action issued in Patent Application No. 20168005141509 dated Jan. 17, 2020.
Gao, Runliang, "On Welding", Science Book & Instrument Corporation, First Edition, Published Nov. 30, 1953, China, p. 121.

* cited by examiner

STEP 1

STEP 2

STEP 3

STEP 4

(A)

(B)

METHOD OF MANUFACTURING IMPELLER

TECHNICAL FIELD

The present invention relates to a method of manufacturing an impeller.

BACKGROUND ART

Since old times, the fabrication of structures has been performed using welding technology. Structures to be manufactured by welding include not only large structures such as ships and bridges, but also precision machines, as exemplified by bodies of automobiles and trains and impellers of rotating machines. For rotating machines such as pumps, compressors and turbines, in recent years, with the size reduction and high performance of the machines, an tip-opening between a hub and a cover (see an tip-opening b2 between a hub and a cover in FIG. 7(D)) has become narrow and the precision requirement has become strict.

When the tip-opening between the hub and the cover is several tens of millimeters or narrower, it is not possible to insert a welding rod to the back of a blade (in the deep direction with respect to the paper plane in the case of FIG. 7(D)), and therefore, it is difficult to apply a normal welding. In response, conventionally, in the case of welding a blade in such a narrow tip-opening that it is not possible to insert the welding rod to the back of the blade, a slot welding is used

CITATION LIST

Patent Literature

Patent Literature 1: JPS55-23705

SUMMARY OF INVENTION

Problem to be Solved

However, in the case of welding the hub to the blade in a state where the outer circumference side of the hub and the outer circumference side of the cover are fixed by a fixture and where the inner circumference side of the hub and the inner circumference side of the cover are not fixed by a fixture (for example, see step 6 of FIG. 9), a large deformation occurs in the hub after the welding. Specifically, the large deformation, as shown in FIG. 7(D), is a drop of the inner circumference side of the hub 2 to the side of the cover 3. As the cause for the deformation, there can be the following matter. That is, since the welding is performed in the state where the outer circumference side is fixed but the inner circumference side is not fixed, it is possible that the contractive force at the time of natural cooling after the welding increases at a position closer to the inner circumference side while the fixed portion is a supporting point and the largest deformation occurs at a boss portion (see a boss portion 18 in FIG. 11) that is closest to the inner circumference side.

Further, in the case of welding the hub to the blade in a state where the hub and the cover are not fixed by a fixture both on the outer circumference side and on the inner circumference side, the deformation of the hub 2 occurs both on the outer circumference side and on the inner circumference side. Similarly, in the case of welding the cover to the blade, a large deformation occurs in the cover after the welding. Conventionally, such a deformation is eliminated by processing, and in the case of an acceptable degree, the structure can be adopted as a product. However, in recent years, since the requirement for the dimensional accuracy of the blade is high, such a deformation is not within a degree in which the deformation is accepted by processing.

The present invention has been made in view of the above problem, and has an object to provide a method of manufacturing an impeller that makes it possible to reduce the deformation of the hub or cover due to the welding.

Means for Solving the Problem

A method of manufacturing an impeller according to one aspect of the present invention, the method comprising:

a step of forming a cover that is provided with a plurality of blades;

a step of disposing a core on the cover such that the core is interposed between the blades;

a step of disposing a hub on the blades, the hub being a plate on which grooves conforming to shapes of the blades are formed; and a step of welding the hub and the blades, wherein through-holes conforming to the shapes of the blades are provided on the core, such that the blades are fitted in the core when the core is disposed.

Thereby, the core physically restrains the deformation of the hub due to the contractive force at the time of natural cooling after the welding, and therefore, it is possible to manufacture an impeller in which the deformation amount of the hub is small. Accordingly, it is possible to improve yield rate, to significantly improve production efficiency, and to reduce manufacturing cost.

A method of manufacturing an impeller according to one aspect of the present invention, in the above method of manufacturing an impeller, the method further comprising a step of breaking and removing the core, when a temperature of the hub becomes lower than a predetermined temperature after the step of welding the hub and the blades.

Thereby, the core is broken when the action of the contractive force on the hub is stopped, and therefore, it is possible to manufacture an impeller in which a space is provided between the hub and the cover, without the deformation of the hub.

A method of manufacturing an impeller according to one aspect of the present invention, in any one of the above method of manufacturing an impeller, wherein a vent hole is provided on the core, and the method further comprises a step of affixing a tape over a gap between the hub and the core and filling an inert gas from the vent hole into a space among the hub, the cover and the core, before the step of welding the hub and the blades.

Thereby, by affixing the tape, it is possible to prevent the inert gas from leaking out of the gap among the hub, the cover and the core, and therefore, it is possible to surely prevent the oxidation of a welding metal.

A method of manufacturing an impeller according to one aspect of the present invention, in any one of the above method of manufacturing an impeller, wherein the through-holes of the core have shapes similar to the shapes of the blades, and are wider than the blades in circumferential width.

Thereby, it is possible to insert the core into interspaces of the blades.

A method of manufacturing an impeller according to one aspect of the present invention, in any one of the above method of manufacturing an impeller, wherein the number of the through-holes provided on the core is the same as the number of the blades, and in the step of disposing the core, the core is disposed by overlaying the core on the cover such that horizontal positions of the plurality of blades roughly coincide with horizontal positions of the corresponding through-holes.

Thereby, it is possible to insert the core into each interspace of the blades.

A method of manufacturing an impeller according to one aspect of the present invention, in any one of the above method of manufacturing an impeller, wherein the cover and the core have disk shapes, and in the step of disposing the core on the cover, the core is disposed such that a central axis of the core roughly coincides with a central axis of the cover.

Thereby, the cover and the core are coaxially disposed.

A method of manufacturing an impeller according to one aspect of the present invention, in any one of the above method of manufacturing an impeller, wherein the hub and the core have disk shapes, and in the step of disposing the hub on the blades, the hub is disposed such that a central axis of the hub roughly coincides with a central axis of the cover.

Thereby, the hub and the cover are coaxially disposed.

A method of manufacturing an impeller according to one aspect of the present invention, in any one of the above method of manufacturing an impeller, wherein the core is formed using a raw material that is used in precision casting.

Thereby, it is possible to reduce the unevenness of the surface of the core. Therefore, even when the unevenness corresponding to the shape of the surface of the core is generated by the welding on a surface of the hub that contacts with the core, the unevenness of the surface can be reduced because the unevenness of the surface of the core is reduced.

A method of manufacturing an impeller according to one aspect of the present invention, in any one of the above method of manufacturing an impeller, wherein the cover is a cover that is carved integrally with the blades by machining.

Thereby, it is possible to inhibit the blades from being taken off from the cover, because there is no joint between the blades and the cover.

A method of manufacturing an impeller according to one aspect of the present invention, in any one of the above method of manufacturing an impeller, wherein holes for welding are provided in the grooves of the hub, and in the step of welding the hub and the blades, a welding material is poured through the holes for welding, and the hub and the blades are welded.

Thereby, it is possible to weld the hub and the blades even for an impeller having such a narrow space that it is hard to insert a welding rod.

A method of manufacturing an impeller according to one aspect of the present invention, in any one of the above method of manufacturing an impeller, wherein the impeller is an impeller of a rotating machine.

Thereby, it is possible to manufacture an impeller in which the deformation amount of the hub is small.

A method of manufacturing an impeller according to one aspect of the present invention, the method comprising:

a step of forming a hub that is provided with a plurality of blades;

a step of disposing a core on the hub such that the core is interposed between the blades;

a step of disposing a cover on the blades, the cover being a plate on which grooves conforming to shapes of the blades are formed; and a step of welding the cover and the blades, wherein through-holes conforming to the shapes of the blades are provided on the core, such that the blades are fitted in the core when the core is disposed.

Thereby, the core physically restrains the deformation of the cover due to the contractive force at the time of natural cooling after the welding, and therefore, it is possible to manufacture an impeller in which the deformation amount of the cover is small. Accordingly, it is possible to improve yield rate, to significantly improve production efficiency, and to reduce manufacturing cost.

A method of manufacturing an impeller according to 13th aspect of the present invention, the method comprising:

a step of forming a hub that is provided with a plurality of blades;

a step of disposing a plurality of divided cores on the hub, such that each of the divided cores is disposed at each interspace of the adjacent blades;

a step of disposing a cover on the hub and the divided plates; and a step of welding the cover and the blades.

Thereby, by using the divided cores, each of the divided cores has light, and it is possible to avoid the collapse due to its own weight. Further, it is possible to decrease the bending moment that is generated in the divided core when the divided core is held up, and to secure the strength allowing works such as the fabrication of the divided core and welding setup (the assembly of the divided core). Since the divided core has a small size, the deformation amount during hardening treatment is also small, and combined with the division structure, it is possible to improve the workability for mounting (assembling) the divided core to the impeller. Further, even when the divided core becomes unusable due to deformation or damage, one of the divided cores only needs to be replaced because of the division structure, and therefore, the influence on fabrication cost is decreased.

A method of manufacturing an impeller according to a 14th aspect of the present invention, in the method of manufacturing an impeller according to the 13th aspect, wherein a hollow space is formed at a center of the hub, the divided cores protrude to an inner circumference side than the hub, and the method comprises a step of providing inner circumference spacers at interspaces of the adjacent divided cores on the inner circumference side, in the step of disposing the divided cores.

Thereby, it is possible to perform the positioning of the divided cores.

A method of manufacturing an impeller according to a 15th aspect of the present invention, in the method of manufacturing an impeller according to the 14th aspect, wherein heights of the inner circumference spacers when the inner circumference spacers are provided are lower than heights of the divided cores, and in the step of welding the cover and the blades, an inert gas is supplied from an inner circumference side, such that the inert gas flows through a passage that is formed between the hub and the cover.

Thereby, it is possible to provide a slight gap between a surface of the divided core and a surface of the divided core, and it is possible to supply the inert gas from the gap.

Therefore, it is possible to avoid a vent hole formation work by which the core is damaged at a high risk.

A method of manufacturing an impeller according to a 16th aspect of the present invention, in the method of manufacturing an impeller according to any one of the 13th to 15th aspect, wherein a hollow space is formed at a center of the hub, the method further comprises a step of mounting a centering fixture in the hollow space formed in the hub, after the step of forming the hub and before the divided cores are disposed, and in the step of disposing the divided cores, the divided cores are disposed such that back surfaces of inner circumference sides of the divided cores contact with a front surface of the centering fixture.

Thereby, the divided cores support the inner circumference side of the cover, and therefore, it is possible to avoid the inner circumference side of the cover provided on the cores from falling down due to the welding.

A method of manufacturing an impeller according to a 17th aspect of the present invention, in the method of manufacturing an impeller according to any one of the 13th to 16th aspect, the method further comprising a step of respectively disposing outer circumference spacers at interspaces of the adjacent blades on outer circumference sides of the divided cores, in the step of disposing the divided cores, wherein in the step of welding the cover and the blades, an inert gas is supplied from an inner circumference side, such that the inert gas flows through a passage that is formed between the hub and the cover.

Thereby, the presence of the outer circumference spacers can restrain the inert gas from leaking to the outside. It is possible to make the inert gas reach a penetration bead that is generated at the time of the welding of the blades, and it is possible to avoid the penetration bead from being oxidized.

A method of manufacturing an impeller according to a 18th aspect of the present invention, in the method of manufacturing an impeller according to any one of the 13th to 17th aspect, wherein the plurality of blades are provided from a center of the hub at an equal angular interval, and shapes of the blades are roughly the same as each other, and shapes of the divided cores are roughly the same as each other.

Thereby, as a wooden pattern for molding the divided cores, only a single set having a small size is needed, and the divided cores can be formed with the same wooded pattern. Further, since the wooden pattern for molding the divided cores has a small size, it is possible to use a small and inexpensive additive manufacturing device for resin shaping, in the fabrication of the wooded pattern, and it is possible to fabricate a wooden pattern (resin pattern) having a relatively high shape accuracy at low cost in a short time. Therefore, it is possible to make the divided cores at low cost in a short time. Alternatively, with the additive manufacturing device, it is possible to mass-produce the same divided cores, based on the same 3D model.

A method of manufacturing an impeller according to a 19th aspect of the present invention, in the method of manufacturing an impeller according to any one of the 13th to 18th aspect, wherein thicknesses of the divided cores are smaller than heights of the blades with respect to a front surface of the hub, by a predetermined length.

Thereby, top surfaces of the blades melt by the welding, and thereby, the blades contract so that the heights become roughly the same as the thicknesses of the divided cores. Therefore, it is possible to prevent unnecessary force from being applied to the divided cores.

A method of manufacturing an impeller according to one aspect of the present invention, the method comprising:

a step of forming a cover that is provided with a plurality of blades;

a step of disposing a plurality of divided cores on the cover, such that each of the divided cores are disposed at each interspace of the adjacent blades;

a step of disposing a hub on the cover and the divided cores; and a step of welding the hub and the blades.

Thereby, by using the divided cores, each of the divided cores has light, and it is possible to avoid the collapse due to its own weight. Further, it is possible to decrease the bending moment that is generated in the divided core when the divided core is held up, and to secure the strength allowing works such as the fabrication of the divided core and welding setup (the assembly of the divided core). Since the divided core has a small size, the deformation amount during hardening treatment is also small, and combined with the division structure, it is possible to improve the workability for mounting (assembling) the divided core to the impeller. Further, even when the divided core becomes unusable due to deformation or damage, one of the divided cores only needs to be replaced because of the division structure, and therefore, the influence on fabrication cost is decreased.

Advantageous Effects of Invention

According to the present invention, the core physically restrains the deformation of the hub due to the contractive force at the time of natural cooling after the welding, and therefore, it is possible to manufacture an impeller in which the deformation amount of the hub is small. Accordingly, it is possible to improve yield rate, to significantly improve production efficiency, and to reduce manufacturing cost.

DESCRIPTION OF EMBODIMENTS

Comparative Example

For making the object of the present invention clearer, a method of manufacturing an impeller 21 of a rotating machine according to a comparative example will be described with use of FIG. 6 to FIG. 10, before the description of a method of manufacturing an impeller of a rotating machine according to an embodiment of the present invention. A technique for welding blades in a narrow tip-opening between a hub and a cover by a slot welding will be described.

Figure 6:
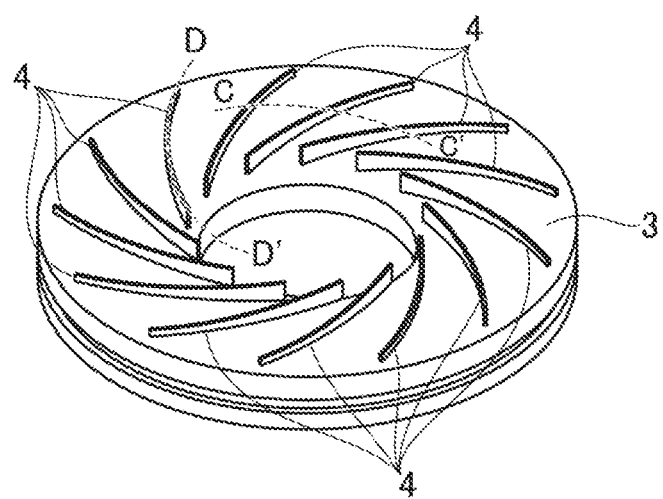
FIG. 6 is a perspective view of a cover 3 according to the comparative example.
Figure 7:
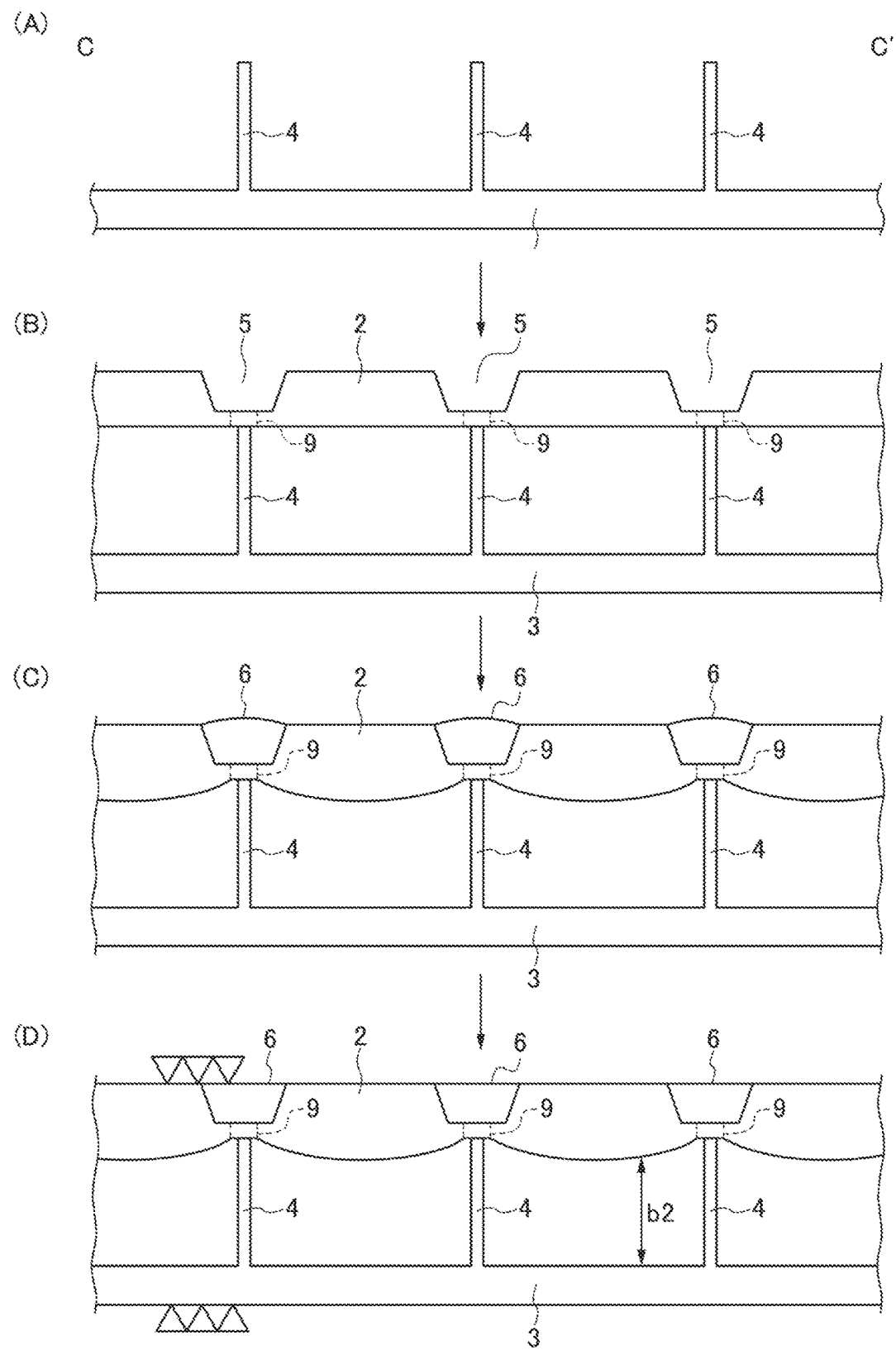
FIG. 7 is a schematic view showing manufacturing steps for the impeller 21 according to the comparative example, using cross sectional views taken from line CC' in FIG. 6.
Figure 8:
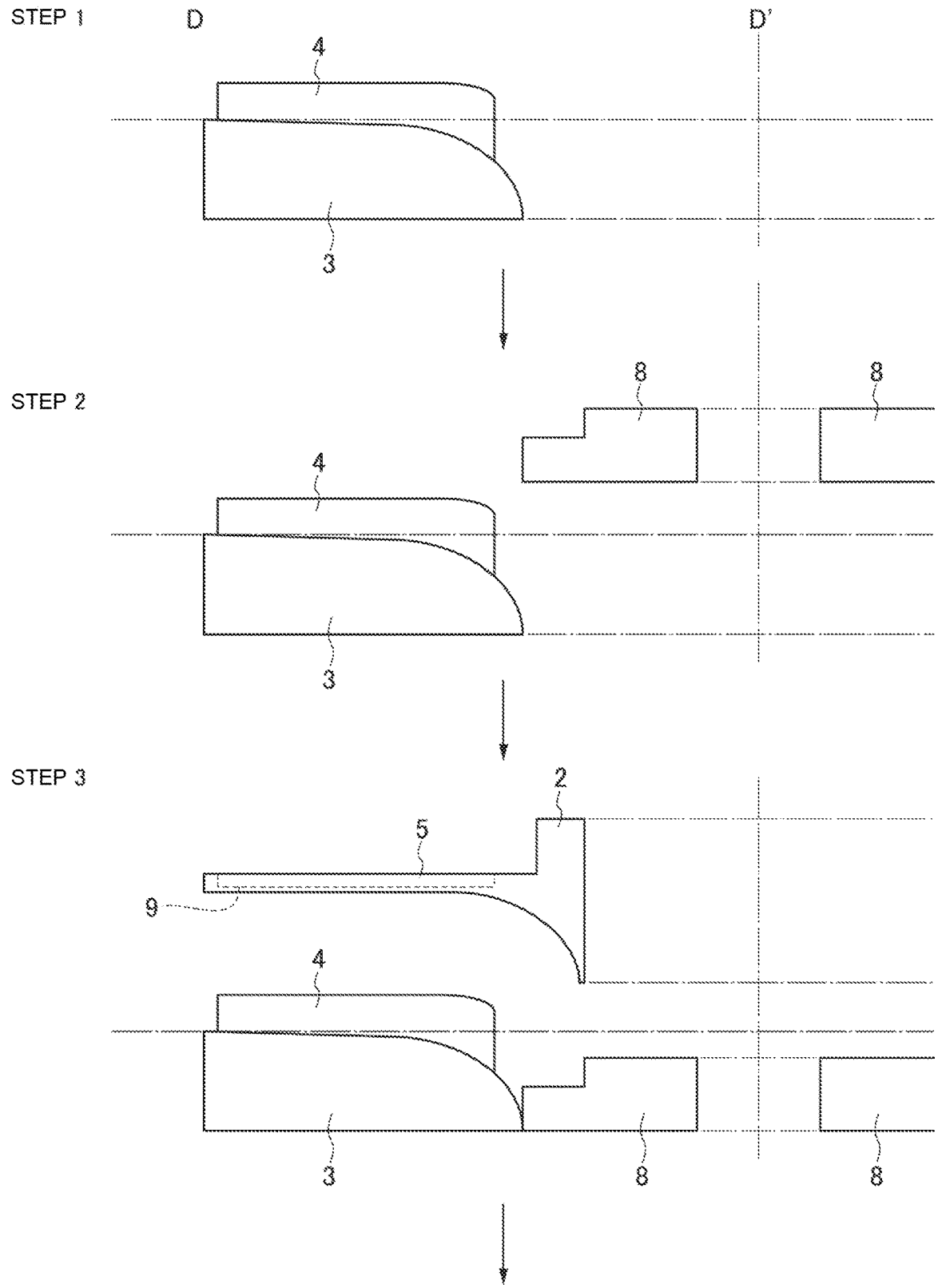
FIG. 8 is a detail view showing manufacturing steps for the impeller 21 according to the comparative example, using cross sectional views taken from line DD' in FIG. 6.
Figure 9:
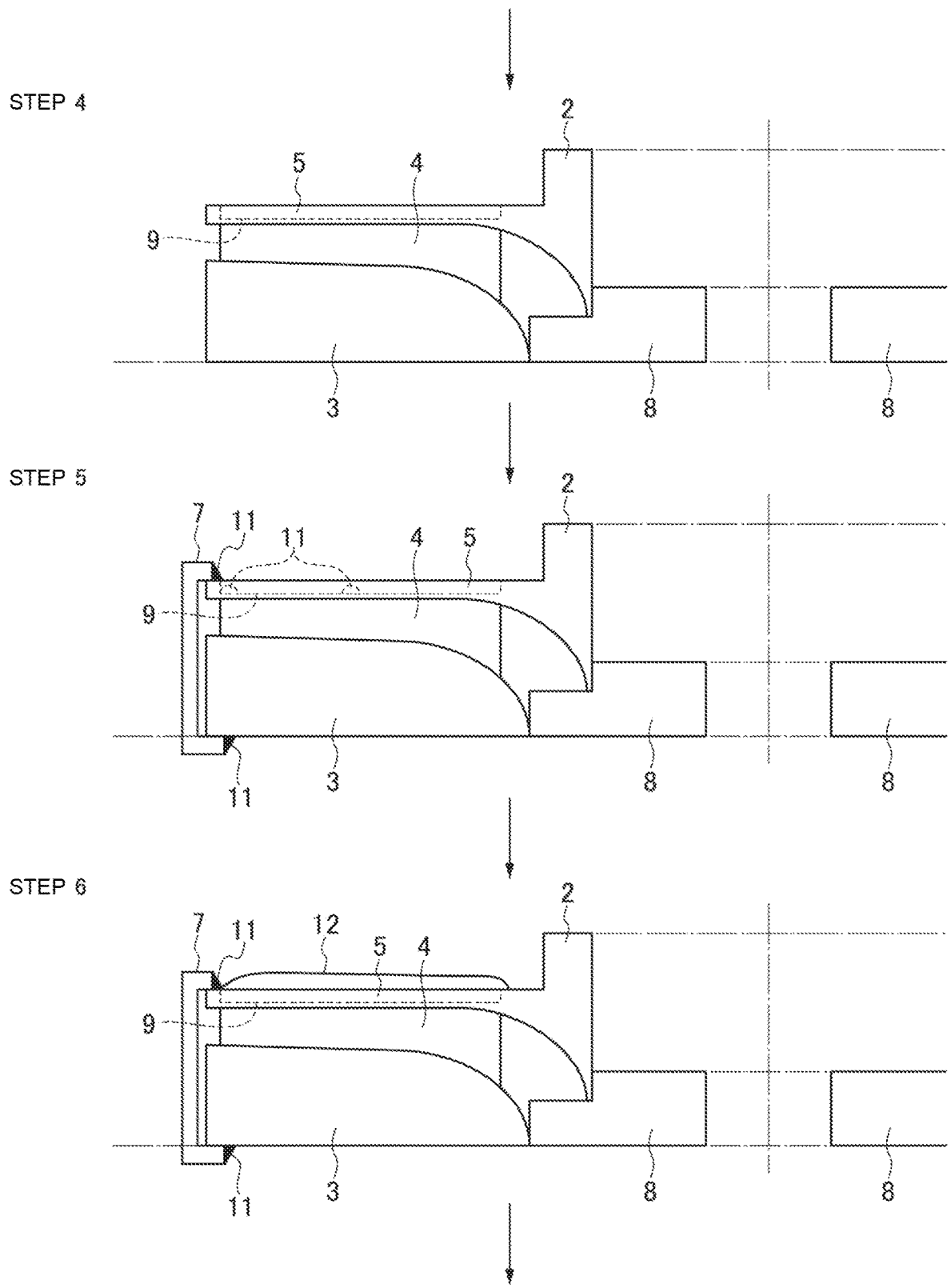
FIG. 9 is a detail view showing manufacturing steps following FIG. 8.
Figure 10:
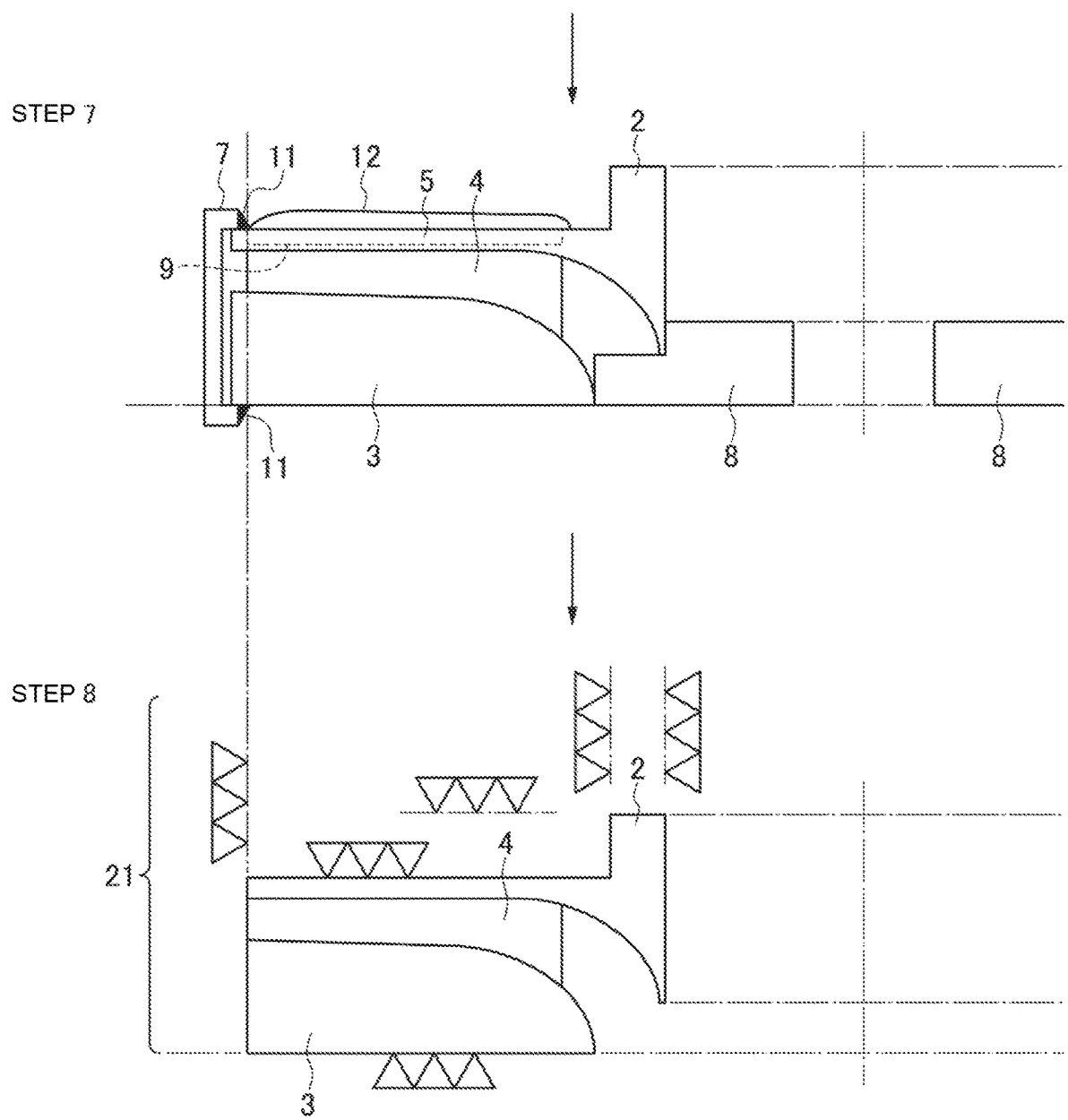
FIG. 10 is a detail view showing manufacturing steps following FIG. 9.

FIG. 6 is a perspective view of a cover 3 according to the comparative example. FIG. 7 is a schematic view showing manufacturing steps for the impeller 21 according to the comparative example, using cross sectional views taken from line CC' in FIG. 6. FIG. 8 is a detail view showing manufacturing steps for the impeller 21 according to the comparative example, using cross sectional views taken from line DD' in FIG. 6. FIG. 9 is a detail view showing manufacturing steps following FIG. 8. FIG. 10 is a detail view showing manufacturing steps following FIG. 9.

The cover 3 shown in FIG. 6 is obtained by carving the cover 3 integrated with blades 4, from a forging material. As shown in FIG. 6, a plurality of blades 4 is provided on the cover 3. As shown in FIG. 7(A), which is a CC' cross-sectional view of FIG. 6, the blades 4 are provided so as to be roughly perpendicular to the cover 3. At this time, as shown in step 1 of FIG. 8, which is a DD' cross-sectional view of FIG. 6, the blades 4 are provided on the cover 3.

Subsequently, as shown in step 2 of FIG. 8, a centering fixture 8 made of steel is placed at the center of the cover 3. Subsequently, as shown in step 3 of FIG. 8 and step 4 of FIG. 9, the hub 2 is placed on the cover 3. In the hub 2, grooves 5 for the slot welding of the blades 4 and the hub 2 are provided on a surface on the side opposite to a surface that contacts with the blades 4. As shown in FIG. 7(B), the shape of the grooves 5 is a similar shape to upper surfaces (bonding surfaces) of the blades 4, and is slightly larger than that of the blades 4. The hub 2 is placed such that the horizontal positions of the blades 4 roughly coincide with the horizontal positions of the grooves 5. As shown by a broken line in step 3 of FIG. 8, a plurality of holes 9 for welding is provided on the grooves 5.

Next, as shown in step 5 of FIG. 9, an outer circumference portion of the hub 2 and an outer circumference portion of the cover 3 are fixed by a fixture 7. The fixture 7 has a zonal plate shape, and by the fixture 7, the outer circumference side of the hub 2 and the outer circumference side of the cover 3 are fixed over the whole circumference. At the same time, as shown by welding portions 11 for fixing, a welding material is poured from the holes 9 provided on the grooves 5. The hub 2 and the blades 4 are temporarily joined by welding, the fixture 7 and the hub 2 are temporarily joined by welding, and the fixture 7 and the cover 3 are temporarily joined by welding.

Next, as shown in step 6 of FIG. 9, an electric welding is performed along the groove 5. Specifically, for example, the slot welding is performed from the inner circumference side of the groove 5 toward the outer circumference side, at an electric current of 60 A to 190 A. On this occasion, the welding material is poured from the holes 9 for welding shown in FIG. 7(C), and the hub 2 and the blades 4 are welded. By the welding, a structure shown in FIG. 7(C) is obtained. As shown in FIG. 7(C), in a cross section taken from line CC' in FIG. 6, there is a deformation by which the hub 2 drops to the side of the cover 3 between the blade 4 and the blade 4.

Next, as shown in step 7 of FIG. 10, an annealing is performed at 500 to 600° C. for about three hours, in order to remove distortion. Next, as shown in step 8 of FIG. 10, a spot fixed by the fixture 7 and the like is eliminated, and a surface processing is performed in accordance with design dimensions. Thereby, the impeller 21 according to the comparative example is completed, and the impeller having a cross section shown in FIG. 7(D) is obtained.

Figure 11:
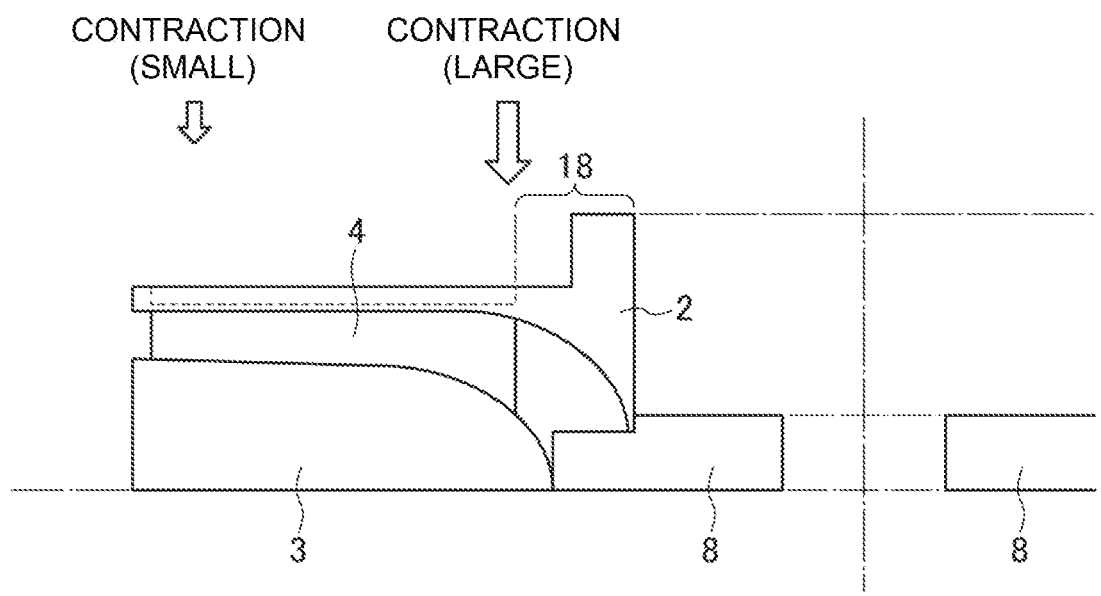
FIG. 11 is a diagram for describing the contraction amount of the impeller 21 according to the comparative example.

As shown in FIG. 7(D), in a cross section taken from line CC' in FIG. 6, there is a deformation by which the hub 2 drops to the side of the cover 3 between the blade 4 and the blade 4. FIG. 11 is a diagram for describing the contraction amount of the impeller 21 according to the comparative example. The welding is performed in a state where the outer circumference side is fixed and the inner circumference side is a free end, and therefore, as shown in FIG. 11, the contraction of the inner circumference side is larger than that of the outer circumference side, so that the deformation of the inner circumference side is larger than that of the outer circumference side.

Embodiment of Present Invention

In response, in an embodiment of the present invention, at the time of the welding, a core is interposed between the hub 2 and the cover 3, and the hub 2 is physically restrained from dropping to the side of the cover 3 between the blade 4 and the blade 4. In the following, a method of manufacturing an impeller 1 of a rotating machine according to the embodiment will be described with reference to FIG. 1 to FIG. 5. Here, for example, the rotating machine is a pump, a turbine, a compressor, or an air blower.

Figure 1:
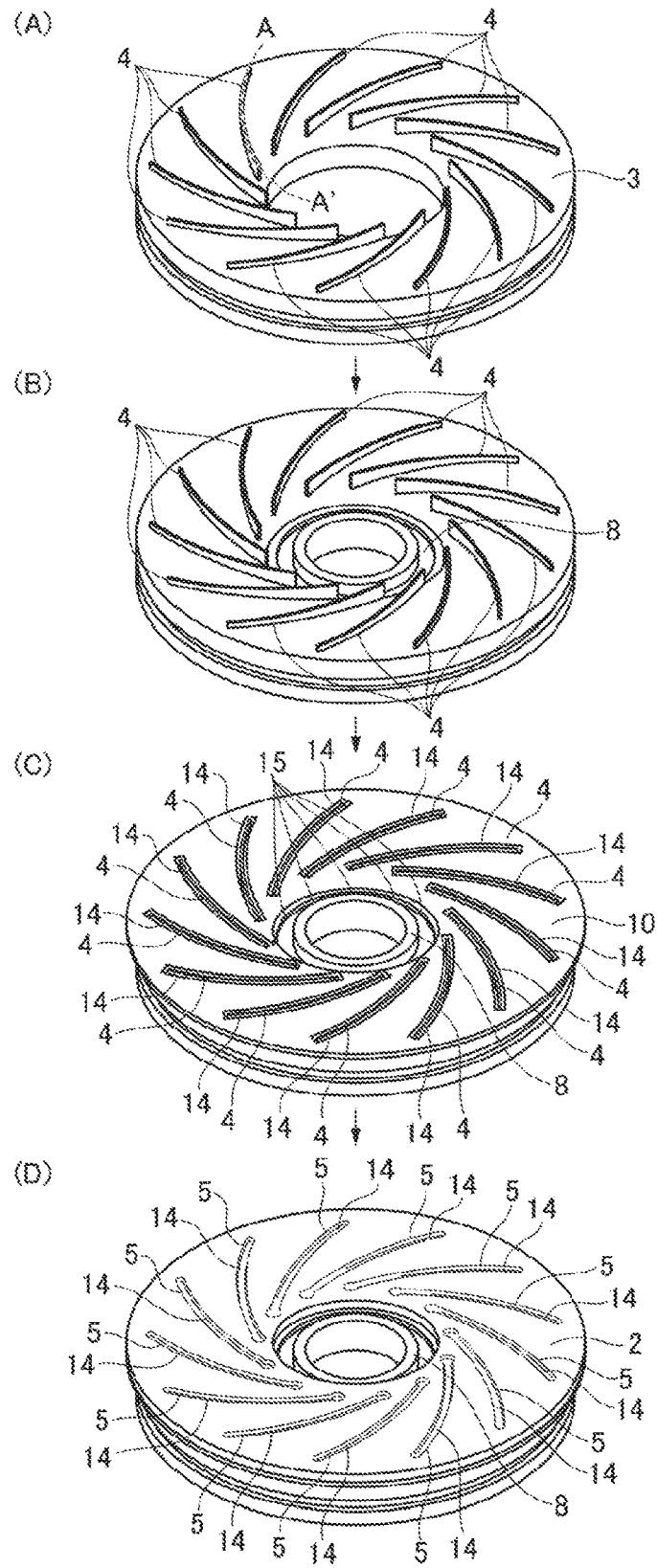
FIG. 1 is a perspective view showing the outline of manufacturing steps for an impeller 1 according to the embodiment.
Figure 2:
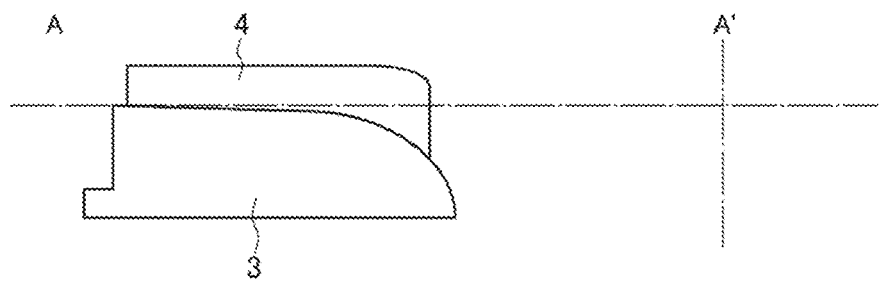
FIG. 2 is a cross-sectional view showing the detail of the manufacturing steps for the impeller 1 according to the embodiment.
Figure 2:
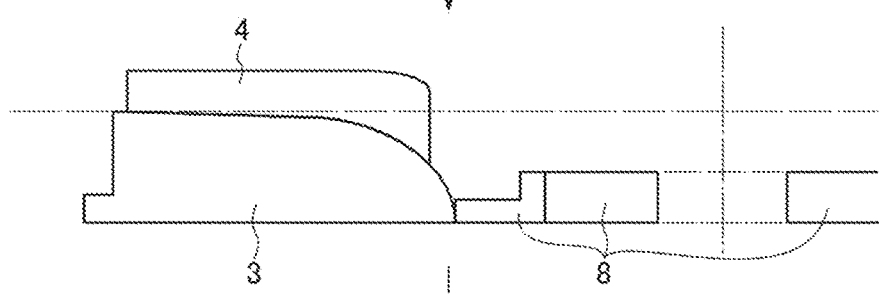
Figure 2:
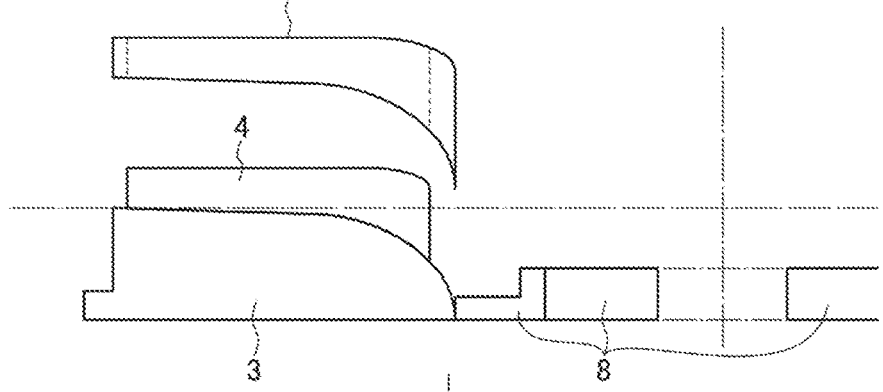
Figure 2:
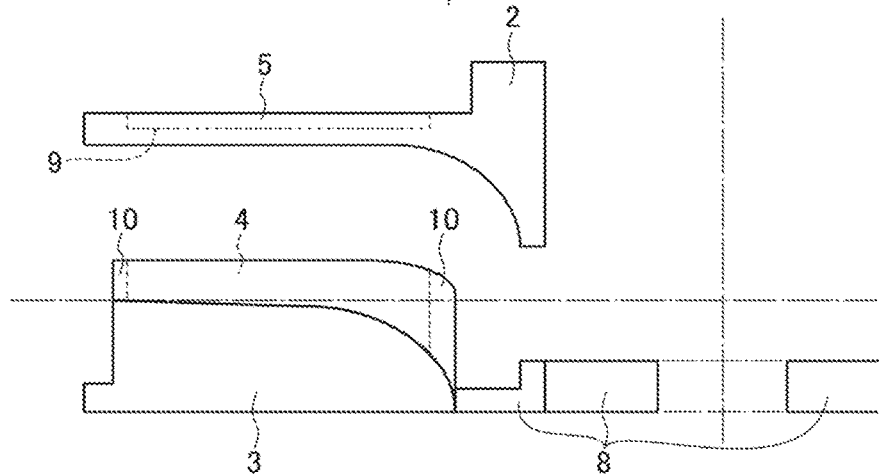
Figure 3:
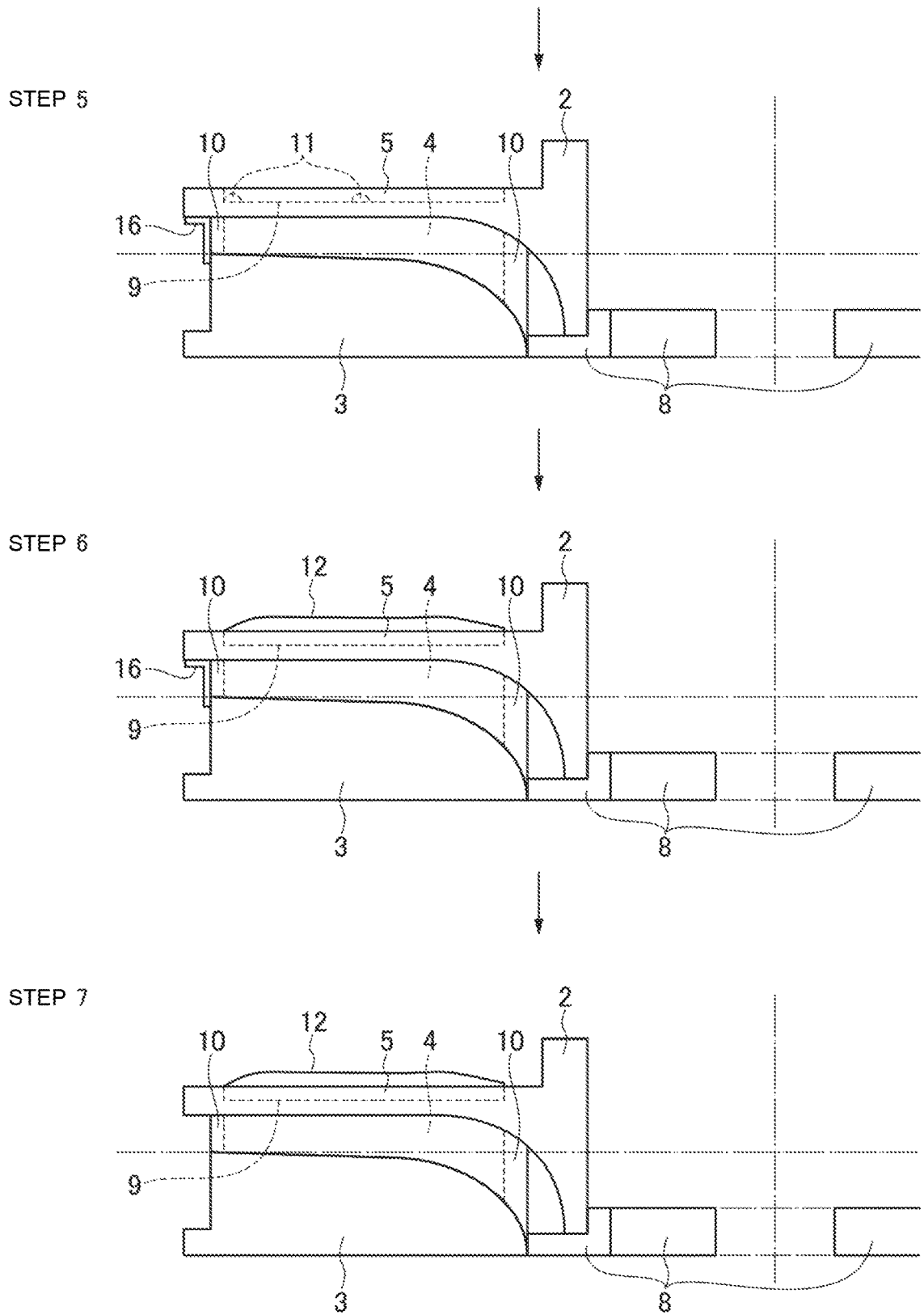
FIG. 3 is a cross-sectional view showing manufacturing steps following FIG. 2.
Figure 4:
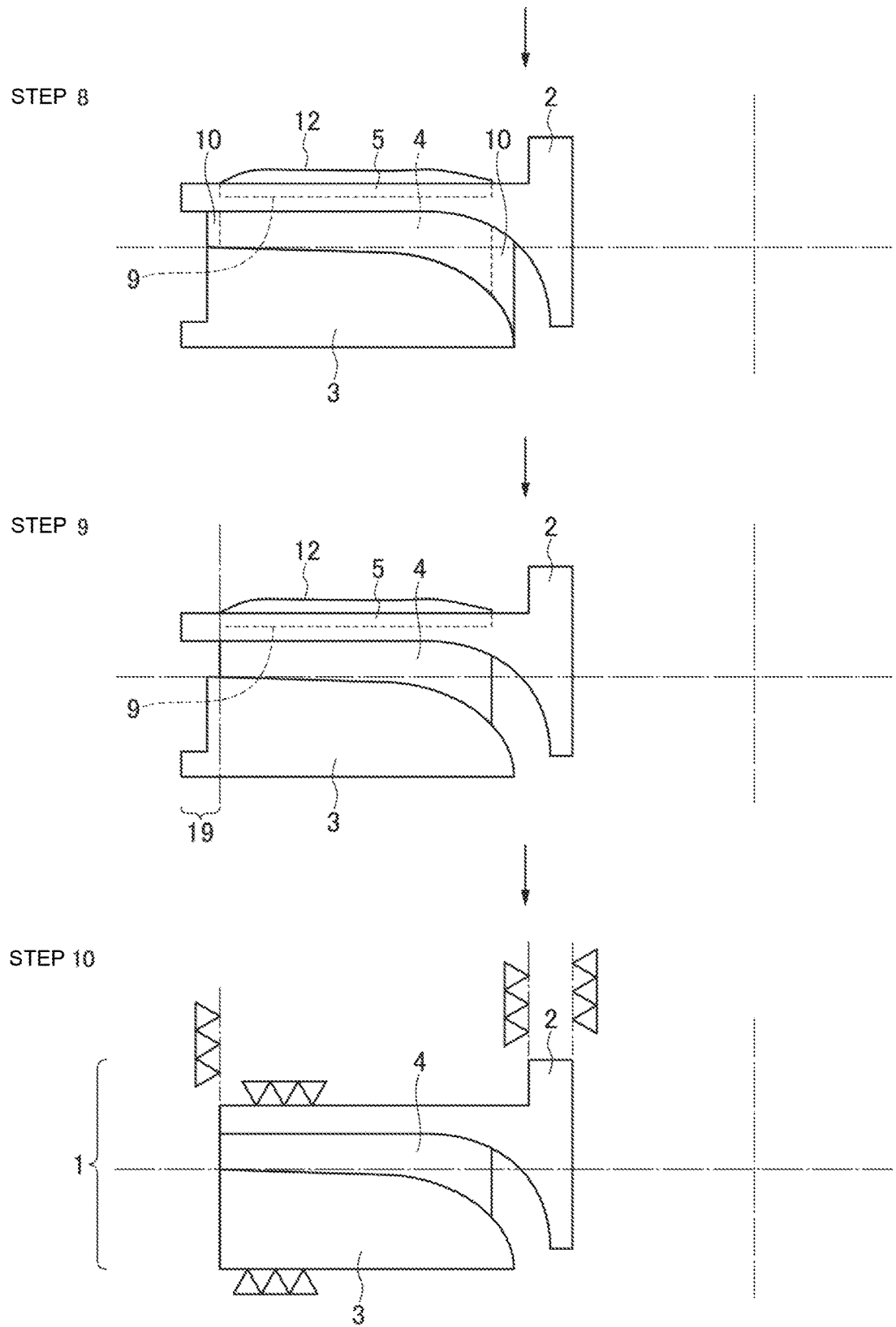
FIG. 4 is a cross-sectional view showing manufacturing steps following FIG. 3.
Figure 5:
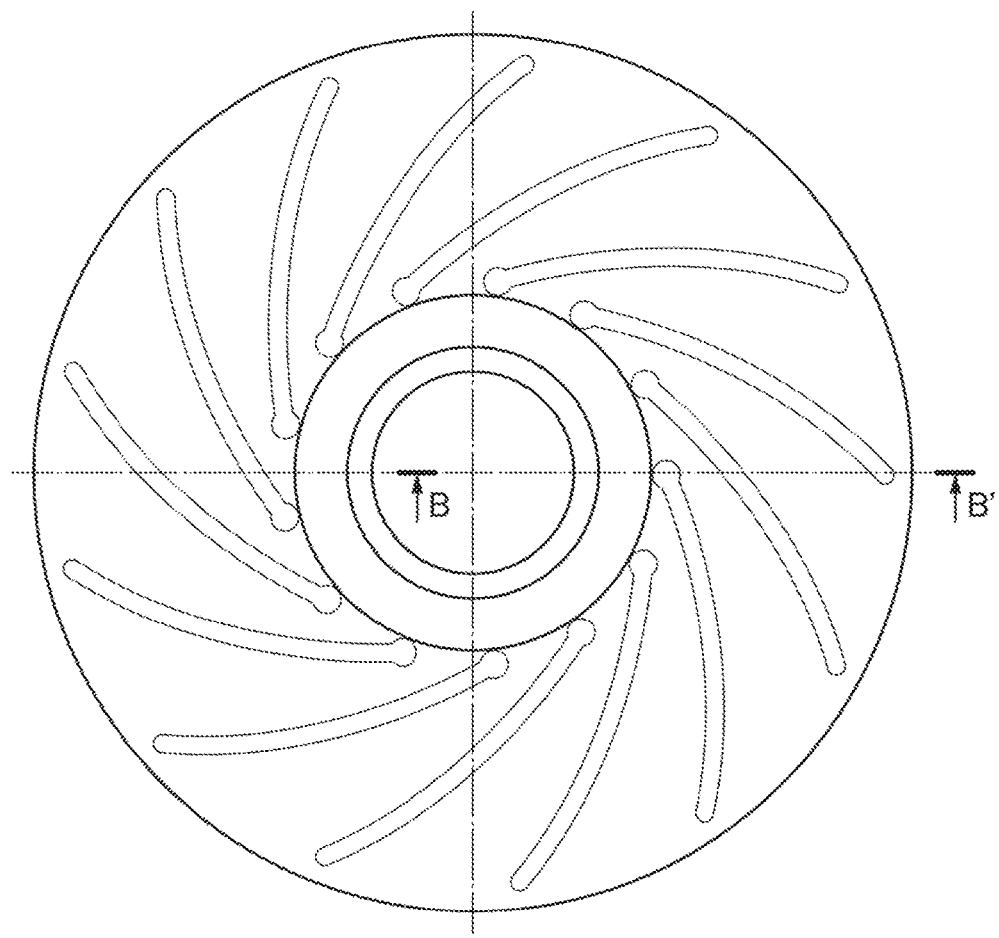
FIG. 5(A) is a top view of an impeller in the state of FIG. 1(D).
FIG. 5(B) is a cross-sectional view taken from line BB' in FIG. 5(A).
Figure 5:
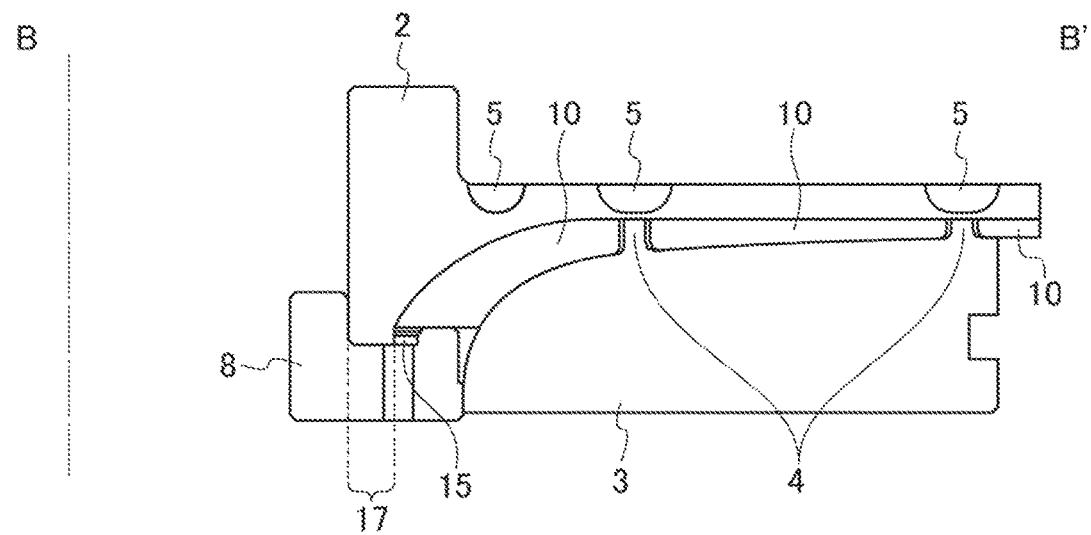

FIG. 1 is a perspective view showing the outline of manufacturing steps for an impeller 1 according to the embodiment. FIG. 2 is a cross-sectional view showing the detail of the manufacturing steps for the impeller 1 according to the embodiment. FIG. 3 is a cross-sectional view showing manufacturing steps following FIG. 2. FIG. 4 is a cross-sectional view showing manufacturing steps following FIG. 3. FIG. 5(A) is a top view of an impeller in the state of FIG. 1(D). FIG. 5(B) is a cross-sectional view taken from line BB' in FIG. 5(A).

First, the cover 3 provided with the blades 4 is formed. Specifically, by machining, the cover 3 is carved from a forging material integrally with the blades 4. As shown in FIG. 1(A), the cover 3 has a disk shape. As shown in step 1 of FIG. 2, the cover 3 is placed. Next, as shown in FIG. 1(B) and step 2 of FIG. 2, a centering fixture 8 is mounted at the center of the cover 3.

Next, as shown in FIG. 1(C) and step 3 of FIG. 2, a core 10 is disposed on the cover 3 such that the core 10 is interposed between the blade 4 and the blade 4. Here, the core 10 has a disk shape, and through-holes (slits) 14 conforming to the shapes of the blades 4 are provided on the core 10, such that the blades 4 are fitted in the core 10 when the core 10 is disposed. The number of the through-holes 14 provided on the core 10 is the same as the number of the blades 4.

The specific disposing method is shown as follows. The core 10 is disposed by overlaying the core 10 on the cover 3 such that the horizontal positions of the plurality of blades 4 roughly coincide with the horizontal positions of the corresponding through-holes 14. On this occasion, the core 10 is disposed such that the central axis of the core 10 roughly coincides with the central axis of the cover 3. In the embodiment, the through-holes 14 of the core 10 have shapes similar to the shapes of the blades 4, and are wider than the blades 4 in circumferential width. Thereby, the blades 4 are fitted in the core 10.

As shown in FIG. 1(C) and FIG. 5(B), a vent hole 15 is provided in the core 10. The vent hole 15 is a hole for back shield gas, and is a hole through which an inert gas such as nitrogen (N2) and argon (Ar) flows for the purpose of the prevention of the oxidation of a welding metal. Here, the welding metal is a metal that melts during the welding and solidifies when the welding is performed.

The core 10 is subjected to high temperatures at the time of the welding, and therefore, it is preferable that the core 10 be made of a high-temperature-resistant material. Further, the core 10 formed using a raw material that is used in precision casting. Here, in precision casting, there is a little unevenness on a cast surface and the like. Thereby, it is possible to reduce the unevenness of the surface of the core 10. Therefore, even when the unevenness corresponding to the shape of the surface of the core 10 is generated by the welding on a surface of the hub 2 that contacts with the core 10, the unevenness of the surface can be reduced because the unevenness of the surface of the core 10 is reduced.

Further, the core 10 needs to be removed after the welding, and therefore, it is preferable that the core 10 be made of a raw material that can be physically broken readily. In the embodiment, as an example, the core 10 is formed using a material described in Patent Literature 1. By using such a material, the physical removal of the core 10 becomes easy.

Next, as shown in FIG. 1(D) and step 4 of FIG. 2, the hub 2 is disposed on the blades 4. As shown in FIG. 1(D), grooves 5 conforming to the shapes of the blades are formed on the hub 2, and a plurality of holes 9 for welding shown by a broken line in step 4 of FIG. 2 is provided on the grooves 5. Further, the hub 2 has a disk shape, and in the step of disposing the hub 2 on the blades 4, the hub 2 is disposed such that the central axis of the hub 2 roughly coincides with the central axis of the cover 3.

As shown in FIG. 5(B), the core 10 is inserted between the hub 2 and the cover 3. Thereby, it is possible to physically restrain the deformation of the hub 2 caused by the solidification and contraction of the welding metal due to the welding. Further, an inner circumference portion 17 of the hub 2 is supported by the centering fixture 8 and the core 10. Thereby, it is possible to physically restrain the deformation of the inner circumference portion 17 caused by the solidification and contraction of the welding metal due to the welding.

As shown in step S of FIG. 3, a tape 16 is affixed over the gap between the hub 2 and the core 10, and the inert gas is filled from the vent hole 15 (see FIG. 5(B)) into the space among the hub 2, the cover 3 and the core 10. Here, the tape 16 has heat-resistant property. By affixing the tape 16, it is possible to prevent the inert gas from leaking out of the gap among the hub 2, the cover 3 and the core 10, and therefore, it is possible to surely prevent the oxidation of the welding metal. Thereafter, end portions of the blades 4 and the grooves 5 of the hub 2 are fixed by welding, to be temporarily joined (see step S of FIG. 3). Thereby, welding portions 11 for fixing are formed.

Thereafter, as shown in step 6 of FIG. 3, the welding material is poured through the plurality of holes 9 for welding, and the hub 2 and the blades 4 are welded. Thereby, it is possible to weld the hub and the blades even for an impeller having such a narrow space that it is hard to insert a welding rod. This welding is a so-called slot welding. The welding current at this time is 60 A to 190 A, for example. By this welding, a welding portion 12 is formed. Thereafter, as shown in step 7 of FIG. 3, the tape 16 is peeled off, after step 6 of FIG. 3, which is a welding step.

Next, as shown in step 7 of FIG. 3, the welded impeller is annealed. The condition of the annealing varies depending on plate thickness or the like. In the embodiment, as an example, the annealing is performed at 500 to 600° C. for about three hours. After the annealing, as shown in step 8 of FIG. 4, the centering fixture 8 playing a role in positioning is removed. Next, as shown in step 9 of FIG. 4, when the hub 2 becomes lower than a predetermined temperature, the core 10 is physically broken and removed. Thereby, the core is broken when the action of the contractive force on the hub is stopped, and therefore, it is possible to manufacture a structure in which a space is provided between the hub and the cover, without the deformation of the hub. Next, as shown in step 10 of FIG. 4, a process of eliminating an outer circumference portion 19 shown in step 9 of FIG. 4, and the like are performed so that design dimensions are obtained. Thereby, the impeller 1 according to the embodiment is completed.

As a result of the measurement with a precision measurement device, in the comparative example, a concave deformation of about 0.5 to 1 mm was observed at a spot where the deformation of the inner circumference side was largest. On the other hand, in the embodiment, at the corresponding spot of the inner circumference side, the deformation hardly appeared, or even the deformation appeared, the deformation was a very small deformation of about 0.1 mm.

As shown in FIG. 11, in the comparative example, in the hub 2, the contraction amount increases and the deformation amount increases in the direction from the outer circumference side to the boss portion 18 of the inner circumference side. Particularly, at the boss portion 18 of the hub 2, because of a free end, a large contraction occurs and the deformation is large. On the other hand, in the embodiment, the core 10 is inserted between the hub 2 and cover 3 of the impeller 1. Thereby, the core 10 can physically restrain the deformation due to the contractive force at the time of natural cooling after the welding, and therefore, it is possible to manufacture an impeller in which the deformation amount of the hub 2 is small. Accordingly, it is possible to improve yield rate, to significantly improve production efficiency, and to reduce manufacturing cost.

In the embodiment, the method of manufacturing the impeller 1 of the rotating machine has been described, but without being limited to this, the use of the core can be also applied to a method of manufacturing another structure. Particularly, it is preferable that the use of the core be applied to a structure having such a narrow space that it is hard to insert the welding rod.

In the embodiment, the blades are provided on the cover, but without being limited to this, the blades may be provided on the hub. In both cases, it is possible to manufacture one impeller from the two elements. Further, since it is possible to carve the blades by machining, it is possible to accurately form the passage, compared to castings. Specifically, the method of manufacturing the impeller includes: a step of forming a hub that is provided with a plurality of blades; a step of disposing a core on the hub such that the core is interposed between the blades; a step of disposing a cover on the blades, the cover being a plate on which grooves conforming to shapes of the blades are formed; and a step of welding the cover and the blades. Further, through-holes conforming to the shapes of the blades are provided on the core, such that the blades are fitted in the core when the core is disposed.

Second Embodiment

In the first embodiment, the core is a single large core having a disk shape, and has nearly the same size as the hub of the impeller. The core has resistance to compression, but is fragile. A corner portion easily chips, or a thin outer circumference portion easily collapses by its own weight. After the molding of the core, the hardening treatment needs to be performed, and on this occasion, a deformation such as a warp easily occurs. Particularly, in the case of a single large core having a disk shape, the deformation is large. As a result, it is difficult to mount the core to the impeller, and the core is easily damaged by forcibly mounting the core.

In the case where the impeller is manufactured using a large disk core as in the case of the first embodiment, the disk core becomes unusable if the disk core has a partial defect. Although primary materials of the core are relatively inexpensive, the fabrication labor cost of the core is expensive. Therefore, if the disk core becomes unusable, a great influence is exerted on the cost. Further, in the core according to the first embodiment, for securing the ventilation of the back shield gas, a work for providing small vent holes is performed. Also at this time, the risk of the damage of the core is high, and therefore, the work requires carefulness and effort.

On the other hand, in a second embodiment, instead of the disk core, there is used a divided core into which the disk core is divided along the shape of the blade. Here, a plurality of divided cores is used, and as an example, division angles around the central axis of the impeller are roughly the same. By using the divided cores into which the core is divided in this way, it is possible to reduce the weight of each of the divided cores, and to avoid the collapse of the divided core due to its own weight.

Figure 14:
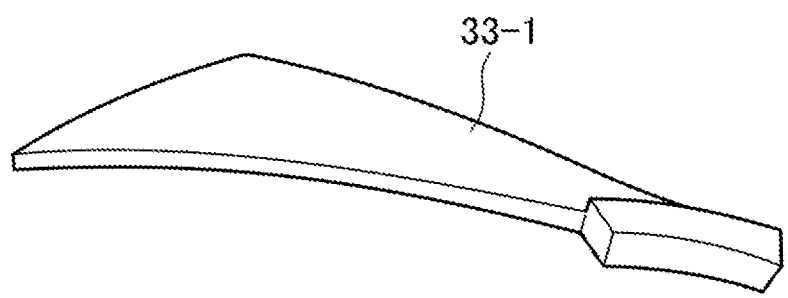
FIG. 14 is a perspective view of one divided core as viewed from the back side.

Since the divided core has a small size, the deformation amount during the hardening treatment is also small, and combined with the division structure, the workability for mounting (assembling) the divided core to the impeller is very high. Even when the divided core becomes unusable due to deformation or damage, one of the divided cores only needs to be replaced because of the division structure, and therefore, the influence on fabrication cost is decreased. Further, as shown in FIG. 14 described later, by providing an inner circumference spacer between the divided core and the divided core and providing a gap between the divided core and the divided core, it is possible to secure the ventilation of the back shield gas, and it is possible to avoid a vent hole making work by which the core is damaged at a high risk.

Figure 12:
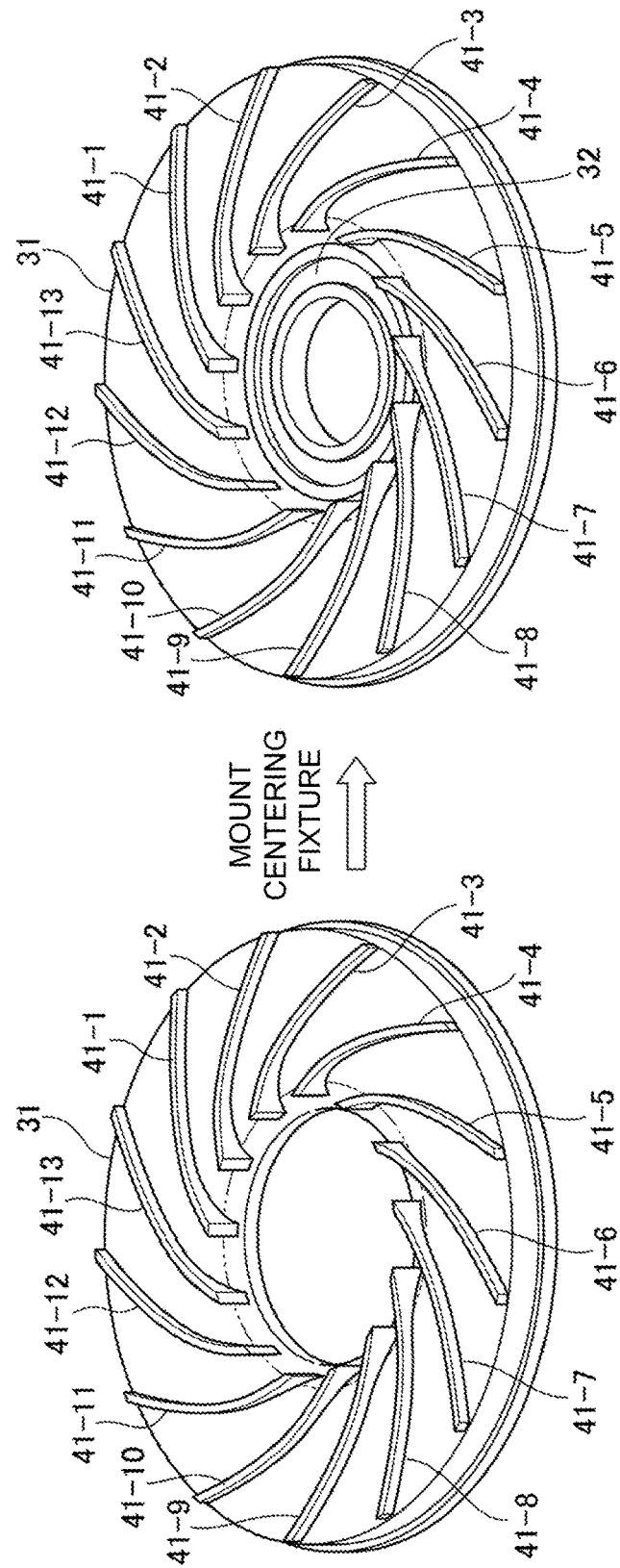
FIG. 12 is a perspective view of a hub before and after a centering fixture is mounted.
Figure 13:
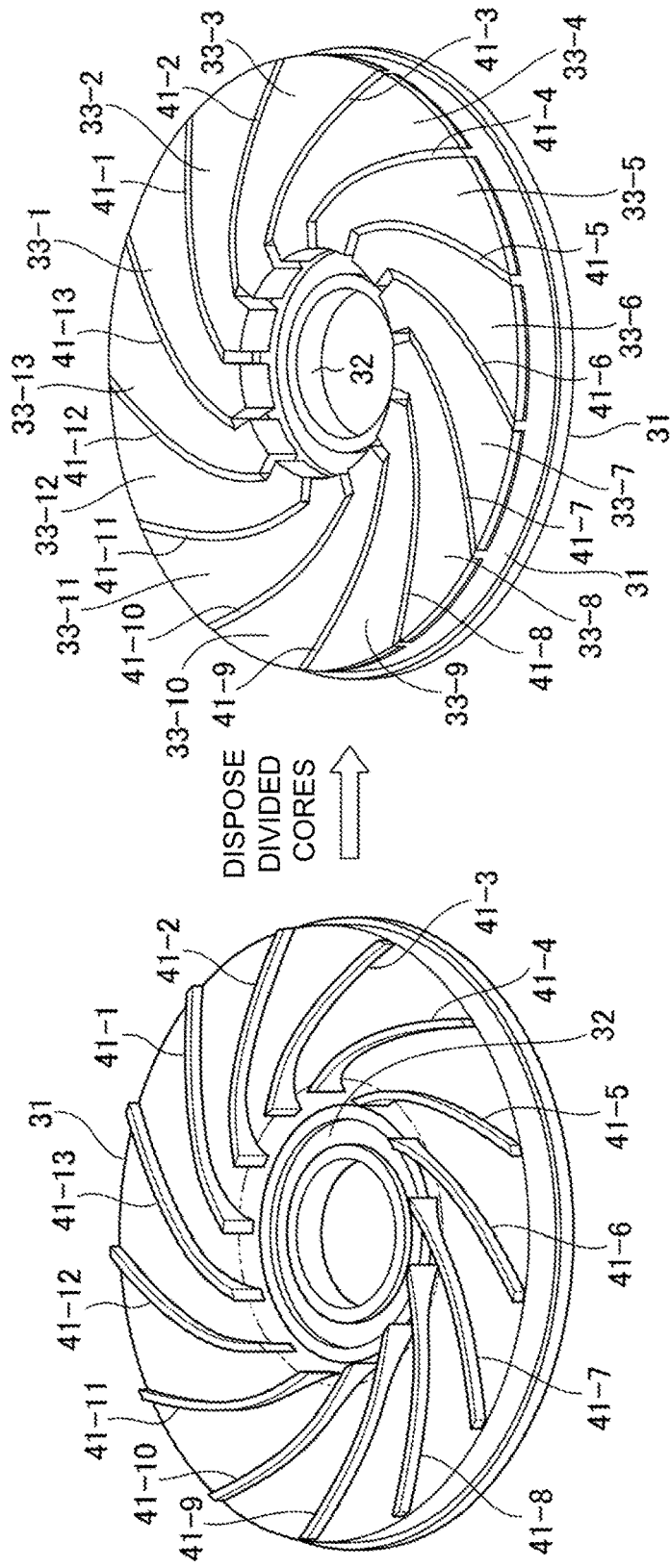
FIG. 13 is a perspective view of the hub before and after divided cores are disposed.
Figure 15:
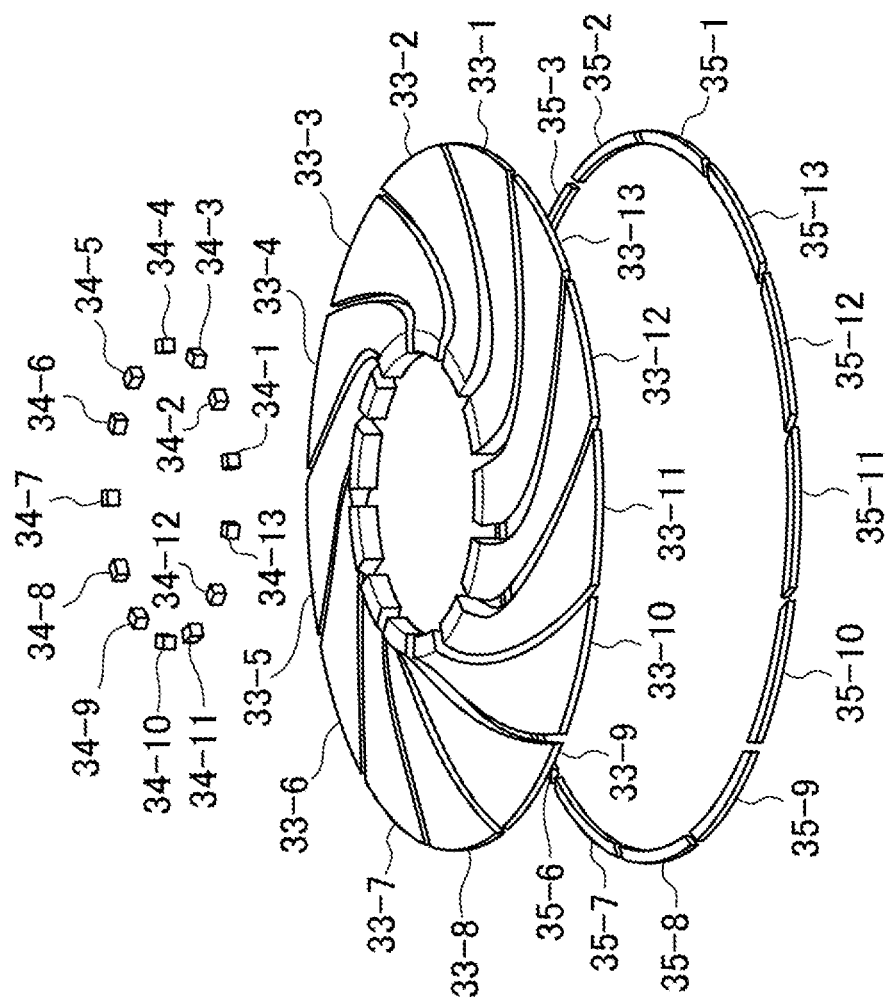
FIG. 15 is an exploded perspective view of the divided cores as viewed from the back side, for describing inner circumference spacers and outer circumference spacers.
Figure 16:
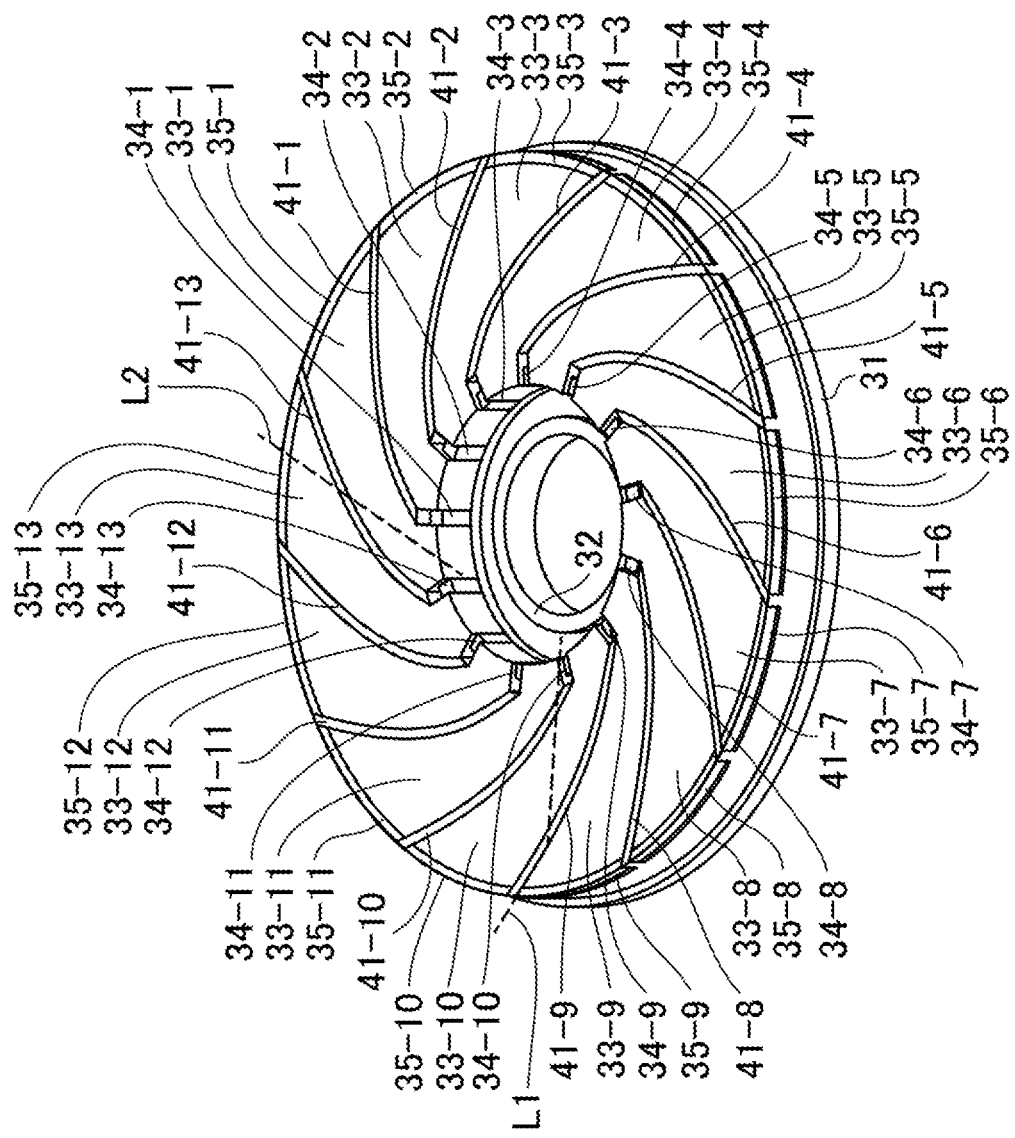
FIG. 16 is a perspective view of the hub when the inner circumference spacers, the outer circumference spacers and the divided cores are disposed.
Figure 17:
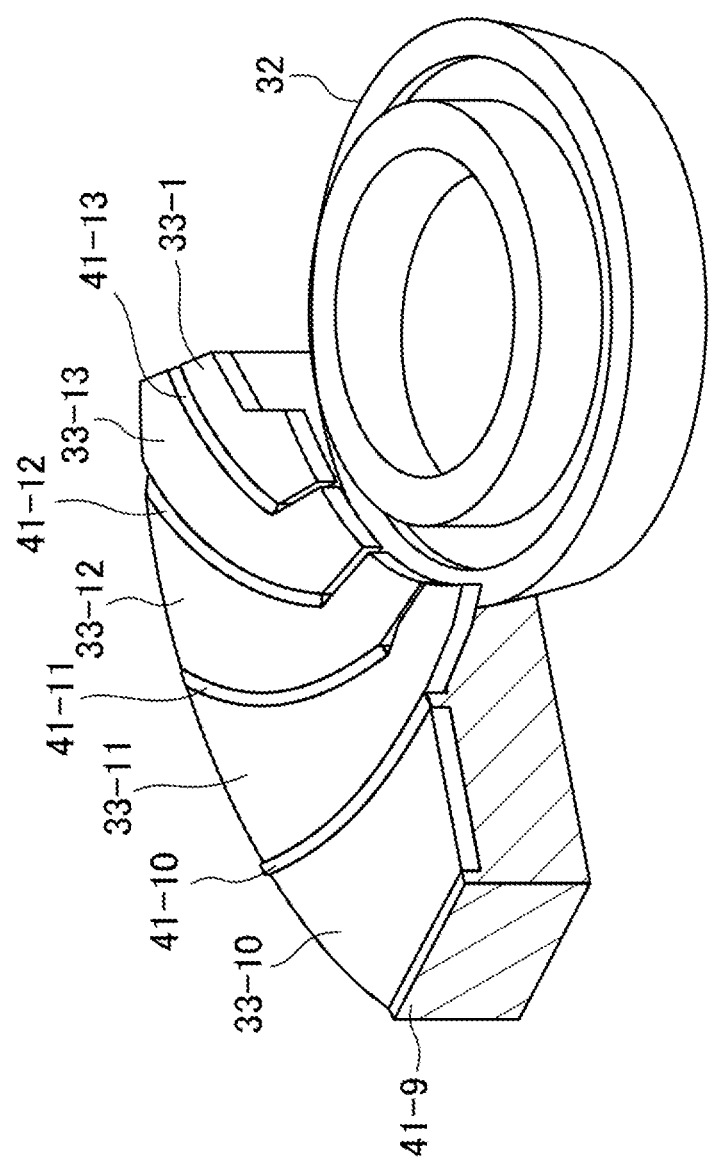
FIG. 17 is a partial perspective view of the hub taken along a polyline L1 and a straight line L2 in FIG. 16.
Figure 18:
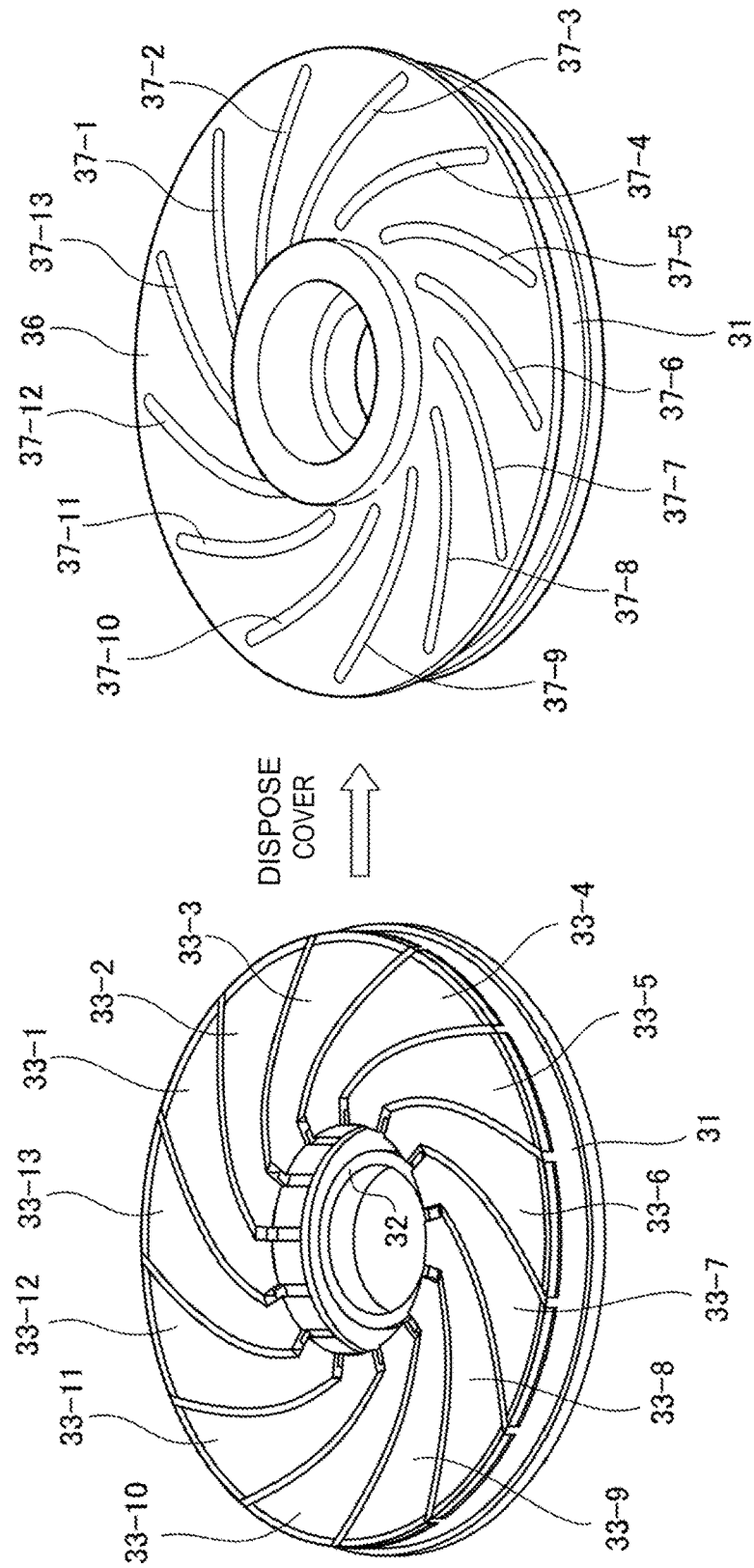
FIG. 18 is a perspective view of the hub before and after a cover is disposed.
Figure 19:
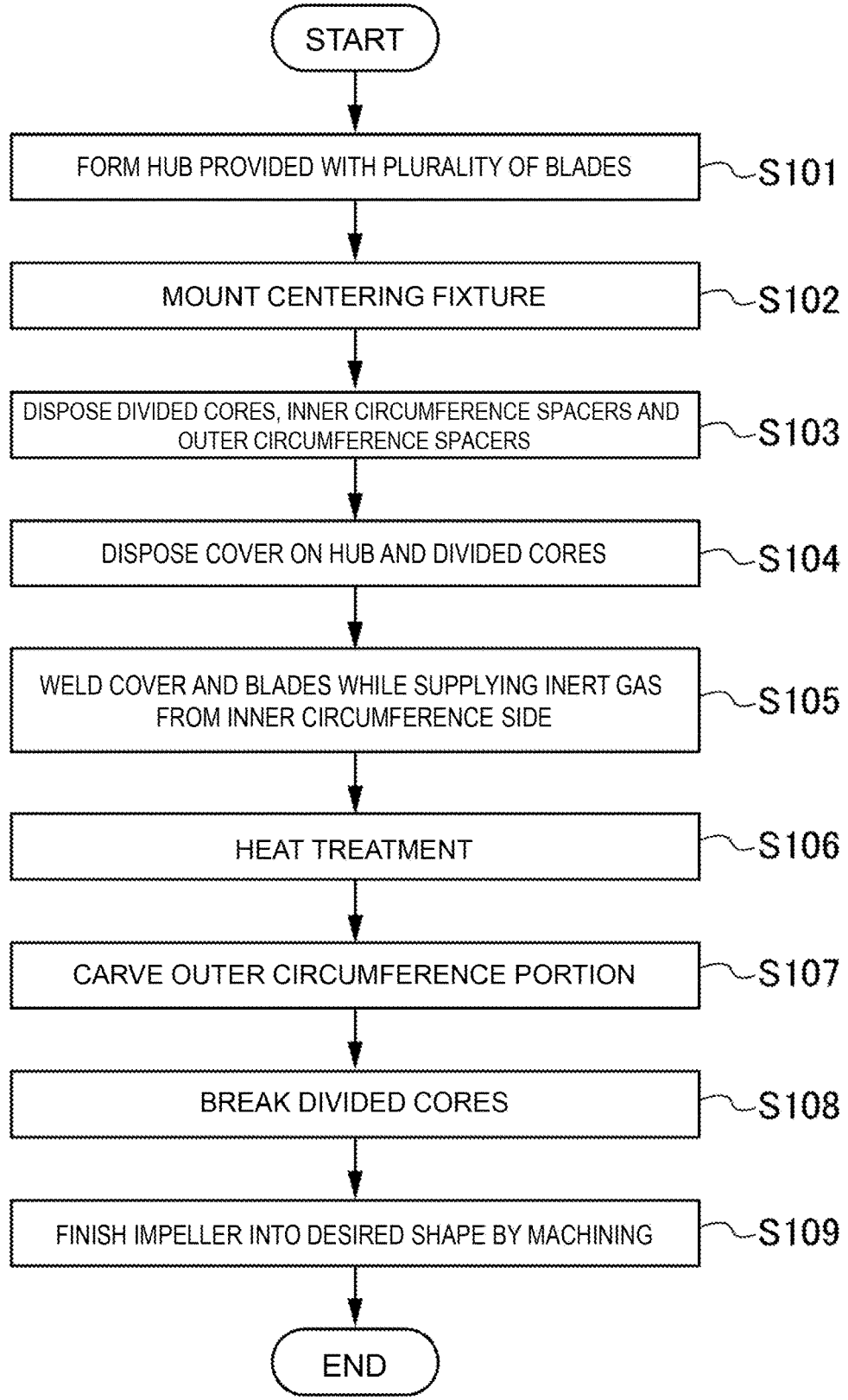
FIG. 19 is a flowchart showing an example of the method of manufacturing the impeller according to the second embodiment.

Subsequently, a method of manufacturing an impeller will be described along a flowchart in FIG. 19, with reference to FIG. 12 to FIG. 18. FIG. 12 is a perspective view of a hub before and after a centering fixture is mounted. FIG. 13 is a perspective view of the hub before and after divided cores are disposed. FIG. 14 is a perspective view of one divided core as viewed from the back side. FIG. 15 is an exploded perspective view of the divided cores as viewed from the back side, for describing inner circumference spacers and outer circumference spacers. FIG. 16 is a perspective view of the hub when the inner circumference spacers, the outer circumference spacers and the divided cores are disposed. FIG. 17 is a partial perspective view of the hub taken along a polyline L1 and a straight line L2 in FIG. 16. In FIG. 17, inner circumference spacers 34-1 to 34-13 and outer circumference spacers 35-1 to 35-13 are omitted. FIG. 18 is a perspective view of the hub before and after a cover is disposed. FIG. 19 is a flowchart showing an example of the method of manufacturing the impeller according to the second embodiment.

In the following, the description will be made along the flowchart in FIG. 19.

(Step S101) First, a hub 31 provided with a plurality of blades 41-1 to 41-13 is formed. Specifically, the hub 31 is carved from a forging material by machining, and thereby, the blades 41-1 to 41-13 are integrally carved. As shown in FIG. 12, the hub 31 has a disk shape, and a hollow space is formed at the center of the hub 31. The plurality of blades 41-1 to 41-13 are provided from the center of the hub 31 at an equal angular interval, and the shapes of the blades 41-1 to 41-13 are roughly the same as each other.

(Step S102) Next, as shown in FIG. 12, a centering fixture 32 is mounted in the hollow space formed in the hub 31.

(Step S103) Next, divided cores 33-1 to 33-13, inner circumference spacers 34-1 to 34-13 and outer circumference spacers 35-1 to 35-13 are disposed. Specifically, as shown in FIG. 13, the plurality of divided cores 33-1 to 33-13 is disposed on the hub 31, such that each of the divided cores 33-1 to 33-13 is disposed at each interspace of adjacent blades. As shown in FIG. 13 and FIG. 17, the divided cores 33-1 to 33-13 protrude to the inner circumference side than from the hub 31.

In the divided core 33-1, the shapes of the divided cores are roughly the same as each other, and the shape of each divided core has a shape shown in FIG. 14. By this configuration, as a wooden pattern for molding the divided cores 33-1 to 33-13, only a single set having a small size is needed, and the divided cores 33-1 to 33-13 can be formed with the same wooden pattern. Further, since the wooden pattern for molding the divided cores 33-1 to 33-13 has a small size, it is possible to use a small and inexpensive additive manufacturing device for resin shaping, in the fabrication of the wooden pattern, and it is possible to fabricate a wooden pattern (resin pattern) having a relatively high shape accuracy at low cost in a short time. Therefore, it is possible to make the divided cores 33-1 to 33-13 at low cost in a short time. Alternatively, with the additive manufacturing device, it is possible to mass-produce the same divided cores, based on the same 3D model.

As shown in FIG. 15 and FIG. 16, in the step of disposing the divided cores 33-1 to 33-13, the inner circumference spacers 34-1 to 34-13 are provided at interspaces of adjacent divided cores 33-1 to 33-13, on the inner circumference side. By this configuration, it is possible to perform the positioning of the divided cores 33-1 to 33-13.

As shown in FIG. 16, the heights of the inner circumference spacers 34-1 to 34-13 when the inner circumference spacers 34-1 to 34-13 are provided are lower than the heights of the divided cores 33-1 to 33-13. In the step of the welding described later, the inert gas is supplied from the inner circumference side, such that the inert gas flows through a passage that is formed between the hub 31 and the cover 36. By this configuration, it is possible to provide a slight gap between a surface of the divided core and a surface of the divided core, and it is possible to supply the inert gas from the gap. Therefore, it is possible to avoid a vent hole formation work by which the core is damaged at a high risk.

As shown in FIG. 15 and FIG. 16, in the step of disposing the divided cores 33-1 to 33-13, the outer circumference spacers 35-1 to 35-13 are respectively disposed at interspaces of adjacent blades 41-1 to 41-13 on the outer circumference sides of the divided cores 33-1 to 33-13.

As shown in FIG. 17, in the step of disposing the divided cores, the divided cores are disposed such that the back surfaces of the inner circumference sides of the divided cores contact with the front surface of the centering fixture 32. By this configuration, the divided cores support the inner circumference side of the cover, and therefore, it is possible to avoid the inner circumference side of the cover provided on the cores from falling down due to the welding.

As shown in FIG. 17, the thicknesses of the divided cores 33-1 to 33-13 are smaller than the heights of the blades with respect to the front surface of the hub 31, by a predetermined length. The predetermined length is a length corresponding to decrease amount of the heights of the blades when the top surfaces of the blades melt by the welding and thereby the blades contract. Thereby, the top surfaces of the blades melt by the welding, and thereby, the blades contract so that the heights become roughly the same as the thicknesses of the divided cores 33-1 to 33-13. Therefore, it is possible to prevent unnecessary force from being applied to the divided cores 33-1 to 33-13.

Further, the divided cores 33-1 to 33-13 need to be removed after the welding, and therefore, it is preferable that the divided cores 33-1 to 33-13 be made of a raw material that can be physically broken readily. In the embodiment, as an example, the divided cores 33-1 to 33-13 are formed using a material described in Patent Literature 1. By using such a material, the physical removal of the divided cores 33-1 to 33-13 becomes easy.

(Step S104) Next, as shown in FIG. 18, the cover 36 on which grooves 37-1 to 37-13 conforming to the shapes of the blades 41-1 to 41-13 are formed is disposed on the hub 31 and the divided cores 33-1 to 33-13.

(Step S105) Next, the cover 36 and the blades 41-1 to 41-13 are welded, while the inert gas is supplied from the inner circumference side. In this way, in the step of the welding, the inert gas is supplied from the inner circumference side, such that the inert gas flows through the passage that is formed between the hub 31 and the cover 36. Thereby, the presence of the outer circumference spacers 35-1 to 35-13 can restrain the inert gas from leaking to the outside. It is possible to make the inert gas reach a penetration bead that is generated at the time of the welding of the blades, and it is possible to avoid the penetration bead from being oxidized.

(Step S106) Next, a heat treatment is performed. For example, the temperature is slowly increased, and then is slowly decreased. Thereby, it is possible to let out residual stress.

(Step S107) Next, an outer circumference portion is carved. Thereby, the outer circumference spacers 35-1 to 35-13 are removed.

(Step S108) Next, the divided cores 33-1 to 33-13 are physically broken by a steel wire or the like.

(Step S109) Next, the impeller is finished into a desired shape by machining. Thereby, the impeller is completed.

Thus, the method of manufacturing the impeller according to the second embodiment includes: the step of forming the hub 31 that is provided with the plurality of blades 41-1 to 41-13; the step of disposing the plurality of divided cores 33-1 to 33-13 on the hub 31, such that the divided cores are respectively disposed at the interspaces of adjacent blades; the step of disposing the cover 36 on the hub 31 and the divided cores 33-1 to 33-13; and the step of welding the cover 36 and the blades 41-1 to 41-13.

In this configuration, by using the divided cores 33-1 to 33-13, each of the divided cores 33-1 to 33-13 has light, and it is possible to avoid the collapse due to its own weight. Further, it is possible to decrease the bending moment that is generated in the divided cores 33-1 to 33-13 when the divided cores 33-1 to 33-13 are held up, and to secure the strength allowing works such as the fabrication of the divided cores 33-1 to 33-13 and welding setup (the assembly of the divided core). Since each of the divided cores 33-1 to 33-13 has a small size, the deformation amount during the hardening treatment is also small, and combined with the division structure, it is possible to improve the workability for mounting (assembling) the divided cores to the impeller. Further, even when the divided cores 33-1 to 33-13 become unusable due to deformation or damage, one of the divided cores 33-1 to 33-13 only needs to be replaced because of the division structure, and therefore, the influence on fabrication cost is decreased.

In the embodiment, the blades 41-1 to 41-13 are formed on the hub 31, but without being limited to this, the blades 41-1 to 41-13 may be formed on the cover 36. In that case, the method of manufacturing the impeller may include: a step of forming a cover that is provided with a plurality of blades; a step of disposing a plurality of divided cores on the cover, such that the divided cores are respectively disposed at interspaces of adjacent blades; a step of disposing a hub on the cover and the divided cores; and a step of welding the hub and the blades.

Thus, the present invention is not limited to the above embodiments themselves, and in the implementation phase, the constituent elements can be modified and embodied without departing from the spirit. Further, various inventions can be made by appropriate combinations of a plurality of constituent elements disclosed in the above embodiments. For example, from all constituent elements shown in the embodiments, some constituent elements may be excluded. Furthermore, constituent elements may be appropriately combined across different embodiments.

REFERENCE SIGNS LIST 1, 21: impeller,
2, 31: hub,
3, 36: cover, 4, 41-1 to 41-13: blade,
5, 37-1 to 37-13: groove,
7: fixture,
8, 32: centering fixture,
9: hole,
10: core,
11: welding portion for fixing,
12: welding portion,
14: through-hole,
15: vent hole,
16: tape,
17: inner circumference portion,
18: boss portion,
19: outer circumference portion,
33-1 to 33-13: divided core,
34-1 to 34-13: inner circumference spacer,
35-1 to 35-13: outer circumference spacer

The invention claimed is:

1. A method of manufacturing an impeller, the method comprising:
    a step of forming a cover that is provided with a plurality of blades;
    a step of disposing a core on the cover such that the core is interposed between the blades;
    a step of disposing a hub on the blades, the hub being a plate on which grooves conforming to shapes of the blades are formed; and
    a step of welding the hub and the blades, wherein
    through-holes conforming to the shapes of the blades are provided on the core, such that the blades are fitted in the core when the core is disposed,
    a vent hole is provided on the core, and
    the method further comprises a step of affixing a tape over a gap between the hub and the core and filling an inert gas from the vent hole into a space among the hub, the cover and the core, before the step of welding the hub and the blades.

2. The method of manufacturing the impeller according to claim 1, the method further comprising a step of breaking and removing the core, when a temperature of the hub becomes lower than a predetermined temperature after the step of welding the hub and the blades.

3. The method of manufacturing the impeller according to claim 1, wherein
    the through-holes of the core are wider than the blades in circumferential width.

4. The method of manufacturing the impeller according to claim 1, wherein
    the number of the through-holes provided on the core is the same as the number of the blades, and
    in the step of disposing the core, the core is disposed by overlaying the core on the cover such that horizontal positions of the plurality of blades coincide with horizontal positions of the corresponding through-holes.

5. The method of manufacturing the impeller according to claim 1, wherein
    the cover and the core have disk shapes, and
    in the step of disposing the core on the cover, the core is disposed such that a central axis of the core coincides with a central axis of the cover.

6. The method of manufacturing the impeller according to claim 1, wherein
    the hub and the core have disk shapes, and
    in the step of disposing the hub on the blades, the hub is disposed such that a central axis of the hub coincides with a central axis of the cover.

7. The method of manufacturing the impeller according to claim 1, wherein
    the core is formed using a raw material that is used in precision casting.

8. The method of manufacturing the impeller according to claim 1, wherein
    the cover is a cover that is carved integrally with the blades by machining.

9. The method of manufacturing the impeller according to claim 1, wherein
    holes for welding are provided in the grooves of the hub, and
    in the step of welding the hub and the blades, a welding material is poured through the holes for welding, and the hub and the blades are welded.

10. The method of manufacturing the impeller according to claim 1, wherein
    the impeller is an impeller of a rotating machine.

11. A method of manufacturing an impeller, the method comprising:
    a step of forming a hub that is provided with a plurality of blades;
    a step of disposing a plurality of divided cores on the hub, such that each of the divided cores is disposed at each interspace of adjacent blades;
    a step of disposing a cover on the hub and the divided cores; and
    a step of welding the cover and the blades,
    wherein:
    a hollow space is formed at a center of the hub,
    the divided cores protrude to an inner circumference side of the hub, and
    the method comprises a step of providing inner circumference spacers at interspaces of adjacent divided cores on the inner circumference side, in the step of disposing the divided cores.

12. The method of manufacturing the impeller according to claim 11, wherein
    heights of the inner circumference spacers when the inner circumference spacers are provided are lower than heights of the divided cores, and
    in the step of welding the cover and the blades, an inert gas is supplied from an inner circumference side, such that the inert gas flows through a passage that is formed between the hub and the cover.

13. The method of manufacturing the impeller according to claim 11, wherein thicknesses of the divided cores are smaller than heights of the blades with respect to a front surface of the hub, by a predetermined length.

14. A method of manufacturing an impeller, the method comprising:
    a step of forming a hub that is provided with a plurality of blades;
    a step of disposing a plurality of divided cores on the hub, such that each of the divided cores is disposed at each interspace of adjacent blades;
    a step of disposing a cover on the hub and divided plates; and
    a step of welding the cover and the blades,
    a hollow space is formed at a center of the hub,
    the method further comprises a step of mounting a centering fixture in the hollow space formed in the hub, after the step of forming the hub and before the divided cores are disposed, and
    in the step of disposing the divided cores, the divided cores are disposed such that back surfaces of inner circumference sides of the divided cores contact with a front surface of the centering fixture.

15. A method of manufacturing an impeller, the method comprising:
    a step of forming a hub that is provided with a plurality of blades;
    a step of disposing a plurality of divided cores on the hub, such that each of the divided cores is disposed at each interspace of adjacent blades;
    a step of disposing a cover on the hub and the divided cores; and
    a step of welding the cover and the blades,
    the method further comprising a step of respectively disposing outer circumference spacers at interspaces of the adjacent blades on outer circumference sides of the divided cores, in the step of disposing the divided cores,
    wherein in the step of welding the cover and the blades, an inert gas is supplied from an inner circumference side, such that the inert gas flows through a passage that is formed between the hub and the cover.

16. A method of manufacturing an impeller, the method comprising:
    a step of forming a hub that is provided with a plurality of blades;
    a step of disposing a plurality of divided cores on the hub, such that each of the divided cores is disposed at each interspace of adjacent blades;
    a step of disposing a cover on the hub and the divided cores; and
    a step of welding the cover and the blades,
    wherein the plurality of blades are provided from a center of the hub at an equal angular interval, and shapes of the blades are the same as each other, and
    shapes of the divided cores are the same as each other.

* * * * *

UNITED STATES PATENT AND TRADEMARK OFFICE
CERTIFICATE OF CORRECTION

PATENT NO. : 10,710,186 B2
APPLICATION NO. : 15/770944
DATED : July 14, 2020
INVENTOR(S) : Esao Yamada et al.

Page 1 of 1

It is certified that error appears in the above-identified patent and that said Letters Patent is hereby corrected as shown below:

On the Title Page

At item (30) Foreign Application Priority Data please add "October 28, 2015 (JP) ............ 2015-211703"

Signed and Sealed this
First Day of September, 2020

Andrei Iancu
*Director of the United States Patent and Trademark Office*